United States Patent
Hathaway et al.

(10) Patent No.: US 8,356,585 B2
(45) Date of Patent: Jan. 22, 2013

(54) PLANETARY ROTARY ENGINE

(75) Inventors: Richard B. Hathaway, Kalamazoo, MI (US); Alex R. Hathaway Shields, Richland, MI (US); David A. Sculthorpe, Farmington Hills, MI (US)

(73) Assignee: Planetary Rotor Engine Company, Burlington, VT (US)

( * ) Notice: Subject to any disclaimer, the term of this patent is extended or adjusted under 35 U.S.C. 154(b) by 655 days.

(21) Appl. No.: 12/485,376

(22) Filed: Jun. 16, 2009

(65) Prior Publication Data

US 2009/0308347 A1 Dec. 17, 2009

Related U.S. Application Data

(60) Provisional application No. 61/132,141, filed on Jun. 16, 2008, provisional application No. 61/132,142, filed on Jun. 16, 2008, provisional application No. 61/132,143, filed on Jun. 16, 2008, provisional application No. 61/132,144, filed on Jun. 16, 2008.

(51) Int. Cl.
| | |
|---|---|
| F02B 53/00 | (2006.01) |
| F01C 1/08 | (2006.01) |
| F01C 1/24 | (2006.01) |
| F03C 2/00 | (2006.01) |
| F03C 4/00 | (2006.01) |
| F04C 2/00 | (2006.01) |
| F04C 18/00 | (2006.01) |
| F16N 13/20 | (2006.01) |

(52) U.S. Cl. .................. 123/242; 123/246; 418/196
(58) Field of Classification Search .................. 123/242, 123/246, 232, 218; 418/196
See application file for complete search history.

(56) References Cited

U.S. PATENT DOCUMENTS

| | | | | |
|---|---|---|---|---|
| 710,756 | A | * 10/1902 | Colbourne | ............... 418/135 |
| 2,097,881 | A | 11/1937 | Hopkins | |
| 2,410,341 | A | 10/1946 | Delamere | |
| 3,439,654 | A | 4/1969 | Campbell, Jr. | |
| 3,584,984 | A | * 6/1971 | Majkowski et al. | ......... 418/28 |

(Continued)

FOREIGN PATENT DOCUMENTS

JP       10311224 A       11/1998

(Continued)

OTHER PUBLICATIONS

International Search Report completed Jan. 22, 2010, from corresponding PCT Application No. PCT/US2009/047481.

(Continued)

*Primary Examiner* — Thomas Denion
*Assistant Examiner* — Cameron Setayesh
(74) *Attorney, Agent, or Firm* — Gardner, Linn, Burkhart & Flory, LLP

(57) ABSTRACT

A planetary engine includes a charge compression system for compressing a charge of air and/or an air and fuel mixture that is precompressed by rotation of the rotors and supplied into a combustion chamber through a rotary valve that may be actively adjusted during operation of the engine to vary the intake valve opening size and/or timing. Exhaust valves may likewise be actively adjustable rotary valves for further engine control. A compression insert mounted between the end wall assemblies absorbs combustion forces and provides rigidity to the engine, as well as occupies all or nearly all of the volume between the rotors at the minimum volume of the combustion chamber to improve the compression ratio of the engine.

26 Claims, 22 Drawing Sheets

U.S. PATENT DOCUMENTS

| | | | |
|---|---|---|---|
| 3,809,026 A | 5/1974 | Snyder | |
| 3,844,256 A * | 10/1974 | Ishikawa et al. | 123/242 |
| 3,922,120 A * | 11/1975 | McCullough et al. | 418/5 |
| 3,990,410 A * | 11/1976 | Fishman | 418/196 |
| 4,627,395 A * | 12/1986 | Tadokoro et al. | 123/216 |
| 4,934,325 A * | 6/1990 | Snyder | 123/246 |
| 5,341,782 A * | 8/1994 | McCall et al. | 123/246 |
| 6,139,290 A | 10/2000 | Masterson | |
| 6,224,358 B1 | 5/2001 | Musser | |
| 6,722,127 B2 | 4/2004 | Scuderi et al. | |
| 7,011,469 B2 | 3/2006 | Sanderson et al. | |
| 7,121,236 B2 | 10/2006 | Scuderi et al. | |
| 7,185,578 B2 | 3/2007 | Sanderson | |
| 7,481,190 B2 | 1/2009 | Scuderi | |
| 7,513,224 B2 | 4/2009 | Heaton | |
| 7,536,984 B2 | 5/2009 | Lou | |
| 7,588,001 B2 | 9/2009 | Branyon et al. | |
| 7,603,970 B2 | 10/2009 | Scuderi et al. | |
| 7,628,126 B2 | 12/2009 | Scuderi | |
| 7,637,234 B2 | 12/2009 | Tussing et al. | |
| 7,644,695 B2 * | 1/2010 | Chadwick | 123/233 |
| 7,690,337 B2 | 4/2010 | Pirault et al. | |
| 7,810,459 B2 | 10/2010 | Branyon et al. | |
| 7,823,547 B2 | 11/2010 | Forner, Sr. et al. | |
| 8,056,528 B2 * | 11/2011 | Chadwick, II | 123/232 |
| 2005/0268881 A1 | 12/2005 | O'Connor | |

FOREIGN PATENT DOCUMENTS

| | | |
|---|---|---|
| JP | 2007522369 T | 8/2007 |
| KR | 20070005440 A | 1/2007 |
| WO | WO 02/070878 A1 | 9/2002 |
| WO | WO 2005/024200 A2 | 3/2005 |

OTHER PUBLICATIONS

Written Opinion of the International Searching Authority for International Application No. PCT/US2009/047481.

Western Michigan University; Wayne Jr., Russell W.; "Design of a Single Cylinder, Planetary Rotary Engine", Jul. 2004.

Western Michigan University; "The Second Research Experiences for Undergraduates Symposium", Jul. 15, 2004, (See "Design of a Single Cylinder, Planetary Rotary Engine" by Wayne Jr., Russell W. pp. 52-57).

* cited by examiner

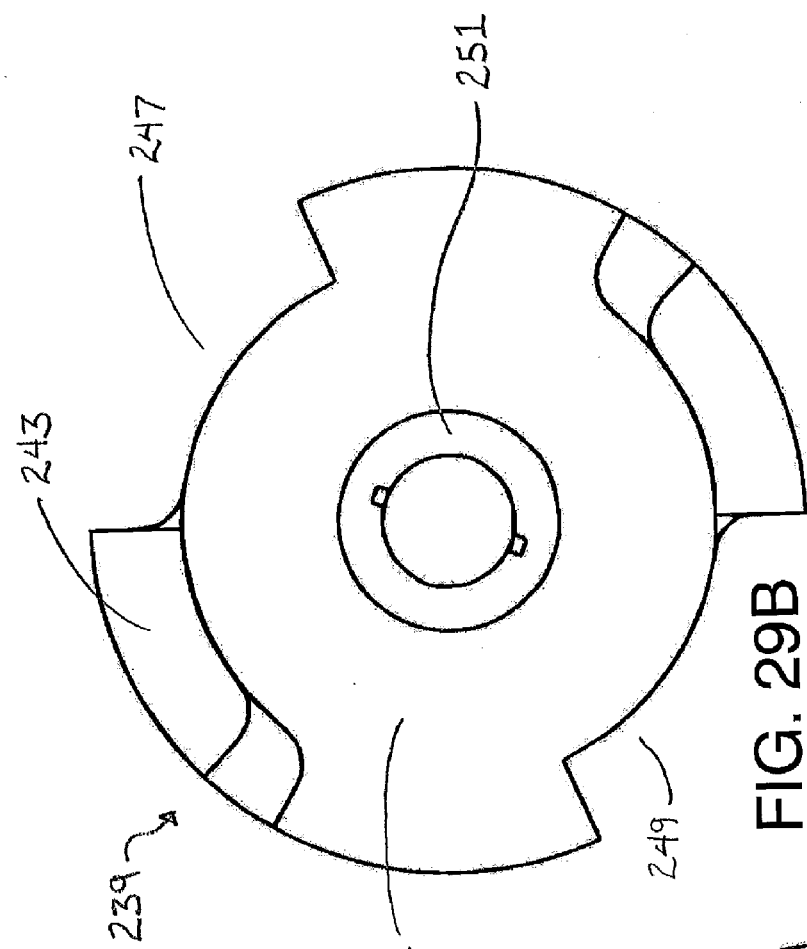
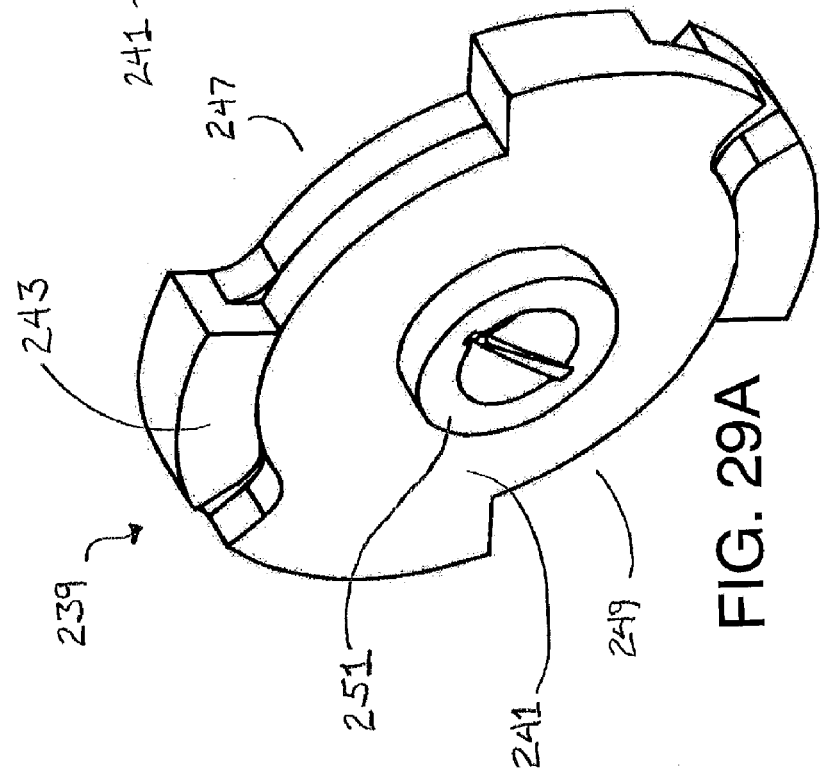
FIG. 29B
FIG. 29A

PLANETARY ROTARY ENGINE

CROSS REFERENCE TO RELATED APPLICATION

The present application claims the benefit of U.S. patent application Ser. No. 61/132,141 filed Jun. 16, 2008, and U.S. patent application Ser. No. 61/132,142 filed Jun. 16, 2008, and U.S. patent application Ser. No. 61/132,143 filed Jun. 16, 2008, and U.S. patent application Ser. No. 61/132,144 filed Jun. 16, 2008, which are all hereby incorporated herein by reference in their entirety.

BACKGROUND AND FIELD OF THE INVENTION

The present invention is directed to planetary rotary apparatuses, and is disclosed below as a planetary rotary engine useable as a combustion engine.

Planetary rotary engines include multiple rotors rotating about parallel rotor axes in the same direction and at the same speed in relative planetary motion. Both two-stroke and four-stroke planetary rotary engines may be provided with intake, compression, power, and exhaust phases being defined by relative rotor position during rotation. Various planetary rotary engine configurations are disclosed, for example, in U.S. Pat. Nos. 2,097,881, 2,410,341, 3,809,026, 3,439,654, 6,139,290, and 6,224,358.

SUMMARY OF THE INVENTION

The present invention provides a planetary-rotary apparatus, disclosed below in a planetary rotary engine embodiment. The planetary rotary engine includes a charge compression system for compressing a charge of air and/or an air and fuel mixture that is precompressed by rotation of the rotors and supplied into a combustion chamber through a rotary valve for improving the power density, which valve may be an actively variable valve for selectively varying the intake valve openings to adjust the timing and/or duration of the intake event, such as based on engine RPM and/or load. The exhaust valves may likewise be actively adjustable rotary valves for further engine control. A compression insert may be mounted between the end wall assemblies of the planetary rotary engine to absorb combustion forces and provide rigidity to the engine and to occupy all or nearly all of the volume between the rotors at the minimum volume of the combustion chamber, thereby effectively raising the compression ratio of the engine. A compressed air charge may alternatively or additionally be supplied into an exhaust system or manifold for reducing emissions. A planetary rotary engine may integrally include an electrical generator for use in hybrid power plant applications and/or multiple planetary rotary engines may be coupled together.

According to an aspect of the present invention, a planetary rotary apparatus comprises a pair of end walls and a housing having an interior sidewall defining a housing chamber. One of the end walls includes an intake port and a rotary intake valve mounted to the end wall outside of the housing chamber, with the rotary intake valve having a valve opening that is selectively rotated into alignment with the intake port. Multiple rotors rotate in concert within the housing chamber and an inner chamber is defined between at least a portion of the rotors. Adjacent and overlapping first and second rotor chambers are formed in the housing chamber and include adjacent first and second chamber wall portions that are approximately semicircular. A first rotor rotates within the first rotor chamber and a second rotor rotates within the second rotor chamber. The first rotor chamber includes a compression intake port for selectively enabling a charge of air or a mixture of air and fuel to be provided into an outer volume of the housing chamber where the outer volume expands between the first and second rotor chambers during rotation of the first and second rotors with the charge being drawn through the compression intake port during expansion of the outer volume. The second rotor chamber includes a transfer port with the charge becoming a precompressed charge when the outer volume is decreased by continued rotation of the first and second rotors and the precompressed charge being discharged through the transfer port out of the housing chamber. The precompressed charge is delivered through a charge manifold extending between the transfer port and the rotary valve and through the rotary valve into the inner chamber when the valve opening aligns with the intake port. In the case of a charge comprising air, the precompressed charge may alternatively and/or additionally be delivered from the transfer port through a charge manifold to an exhaust manifold for reducing emissions, where the alternative or additional charge manifold is connected to the exhaust manifold.

In embodiments of the planetary rotary engine, the rotary valve may be mounted to a rotor shaft of one of the rotors and may be connected to the shaft for selective relative rotational movement with respect to the rotor shaft such that the valve opening is adjustable relative to the rotor shaft. The engine may be a four-stroke engine with a single valve opening on the rotary valve, or may be a two-stroke engine with two valve openings on the rotary valve. The compression intake port may be defined as an opening on one of the end walls that is selectively opened and closed by the first rotor. The transfer port may be defined as an opening on the second chamber wall portion that is selectively opened and closed by the second rotor. In particular embodiments, the engine may include four rotors, which rotors may have an elliptical cross sectional profile and a pair of opposed lobes. In embodiments of the engine a compression insert may be mounted between the end walls within the inner chamber. An additional compression intake port and an additional transfer port may be included on adjacent third and fourth rotor chambers for providing additional precompressed charges to the inner chamber.

According to another aspect of the present invention, a planetary rotary apparatus comprises a pair of end walls and a housing having an interior sidewall defining a housing chamber. A plurality of rotors mounted to rotor shafts rotate in concert within the housing chamber with the axes of rotation extending between the end walls. The housing chamber includes an inner combustion chamber defined between the end walls and at least a portion of the rotors, with the volume of the inner combustion chamber varying between a maximum volume and a minimum volume with rotation of the rotors defining the combustion chamber. A compression insert is located within the inner combustion chamber and extends between and is affixed to the end walls to occupy a portion of the volume of the combustion chamber whereby the minimum volume of the combustion chamber is substantially reduced relative to the minimum volume of the combustion chamber without the compression insert. The rotary valve may operate as either an intake or an exhaust valve and the planetary rotary engine may include multiple such rotary valves. The rotary valve or valves may be nested for rotation within cavities on an end wall assembly of the planetary rotary engine, with the cavity including a valve port and the rotary valve opening aligning with the valve port during rotation of the rotary valve to open the valve port.

In particular embodiments the compression insert includes an elongate portion and a mounting head, with one of the end walls including an insert cavity for receiving the mounting head. An end wall may include a valve port proximate the insert cavity and the mounting head having a profile conforming to the valve port whereby flow through the valve port is unobstructed by the compression-insert. In particular embodiments the engine may include four substantially elliptical rotors with the combustion chamber being defined by the rotors and the compression insert being centrally located within the combustion chamber. Each rotor would include a pair of laterally opposed lobes with one of the lobes of each rotor of being simultaneously proximate the compression insert when the combustion chamber is at the minimum volume. In still further embodiments, one of the end walls includes a valve port and a rotary valve operatively mounted to the end wall, with the rotary valve having a valve opening that is selectively rotated into alignment with the valve port. The rotary valve being mounted to a rotor shaft of one of the rotors and being rotatably connected to the rotor shaft for selective relative rotational movement with respect to the rotor shaft such that the valve opening is adjustable relative to the rotor shaft by relative movement of the rotary valve on the rotor shaft.

According to still another aspect of the present invention, a planetary rotary apparatus includes a rotary valve having at least one valve opening and is connected to a rotor shaft for rotation both with the rotor shaft and for selective relative rotational movement of the rotary valve with respect to the rotor shaft. As such the valve opening of the rotary valve is adjustable by relative movement of the rotary valve on the rotor shaft.

In particular embodiments, the rotary valve comprises adjacently mounted first and second valve disks that cooperatively define the valve opening. At least one of the first and second valve disks is rotatably connected to the rotor shaft for selective relative rotational movement with respect to the rotor shaft such that the size of the valve opening and/or the orientation of the valve opening is adjustable relative to the rotor shaft by relative movement of the first and/or second valve disk on the rotor shaft. Both the first and second valve disks may be rotatably connected to the rotor shaft for selective rotational movement of the first and second valve disks relative to the rotor shaft. In particular embodiments the first and second valve disks each include a mounting opening for receiving the rotor shafts, with at least one of the mounting openings including a helical groove and with axial translational movement of the rotor shaft relative to the rotary valve imparting selective rotational movement of one or both of the first and second valve disks via the rotor shaft acting on the helical groove. The rotor shaft may include one or more keys, such as helical keys, disposed within the helical groove of the first and/or second valve disk, with axial translational movement of the rotor shaft imparting selective rotational movement of the first and/or second valve disk via the key acting on the helical groove. Alternatively, the rotor shaft may include a helical shaft groove that aligns with the helical groove or grooves on the first and/or second valve disks with a plurality of ball bearings being disposed within the grooves. Axial translational movement of the rotor shaft relative to the rotary valve then imparts selective rotational movement of one or both of the first and/or second valve disks via the ball bearings. A compression insert may optionally be located within an inner chamber of the planetary rotary engine and extend between and be affixed to opposite end walls to occupy a portion of the volume of the inner chamber.

In still further embodiments, the first valve disk includes a circular base portion and an arcuate portion extending from the periphery of the circular base and the second valve disk is substantially circular and includes a well and an arcuate gap along the periphery of the second valve disk. The base portion of the first valve disk is nested within the well of the second valve disk with the arcuate portion of the first valve disk being positioned at the arcuate gap of the second valve disk, with the valve opening being defined by the portion of the arcutate gap of the second valve disk that is not filled by the arcuate portion of the first valve disk.

According to still another aspect of the present invention, a planetary rotary apparatus comprises a pair of end walls and a housing having an interior sidewall defining a housing chamber with a plurality of rotors rotatable in concert within the housing chamber and having axes of rotation extending between the end walls. A plurality of rotor shafts are each operatively connected with a rotor with at least a portion of the rotor shafts having geared ends. A ring gear is disposed about the geared ends and rotates with rotation of the rotors, with the ring gear including a plurality of magnets affixed to an outer surface of the ring gear. A stationary outer coil is disposed about and surroundings the ring gear such that the ring gear rotates internally of the outer coil with rotation of the ring gear generating an electrical current. In a particular embodiment the planetary rotary apparatus includes four said rotors and four said rotor shafts with each rotor shaft including a geared end. The electrical generating planetary rotary apparatus may optionally include a precompression charge system, a compression insert, and/or actively variable valves as disclosed herein.

According to yet another aspect of the present invention, a planetary rotary apparatus system comprises a plurality of planetary rotary apparatuses, each of which includes a drive system driven by rotor shafts with each drive system including an output shaft, the system further includes a gear box having a main output shaft. The output shafts of the planetary rotary apparatuses being connected to the gear box whereby the planetary rotary apparatuses combine to drive or be driven by the main output shaft of the gear box. Braces may be used to join the individual planetary rotary apparatuses together. The planetary rotary apparatuses of the system may optionally include a precompression charge system, a compression insert, and/or actively variable valves as disclosed herein.

Methods of operating planetary rotary apparatuses in accordance with the present invention are further encompassed. For example, such methods include drawing a charge through a precompression intake port into a housing chamber at a first rotor chamber, compressing the charge between the first rotor chamber and an adjacent second rotor chamber to create a precompressed charge, discharging the precompressed charge out of the housing chamber through a transfer port at the second rotor chamber, and delivering the precompressed charge through a rotary valve into an inner chamber of the planetary rotary apparatus. Such method may be utilized with a planetary rotary apparatus having actively variable valving and/or a compression insert.

Still another method includes providing a planetary rotary apparatus with an actively variable rotary valve mounted to a rotor shaft and rotating the rotary valve relative to the rotor shaft during operation to adjust a valve opening of the rotary valve. The rotary valve may include first and second valve disks that are mechanically linked to the rotor shaft by helixes, with the method including moving the rotor shaft axially for rotating one or both of the first and second valve disks relative to the rotor shaft to adjust the valve opening size and/or timing at which the valve opening is exposed to a valve port.

These and other objects, advantages, purposes and features of this invention will become apparent upon review of the following specification in conjunction with the drawings.

BRIEF DESCRIPTION OF THE DRAWINGS

FIG. 29A is a perspective view of an alternative actively variable rotary valve in accordance with an aspect of the present invention having two rotary valve openings;

FIG. 29B is a top plan view of the rotary valve of FIG. 29A;

DESCRIPTION OF THE PREFERRED EMBODIMENTS

The present invention will now be described with reference to the accompanying figures, wherein the numbered elements in the following written description correspond to like-numbered elements in the figures.

Figure 1:
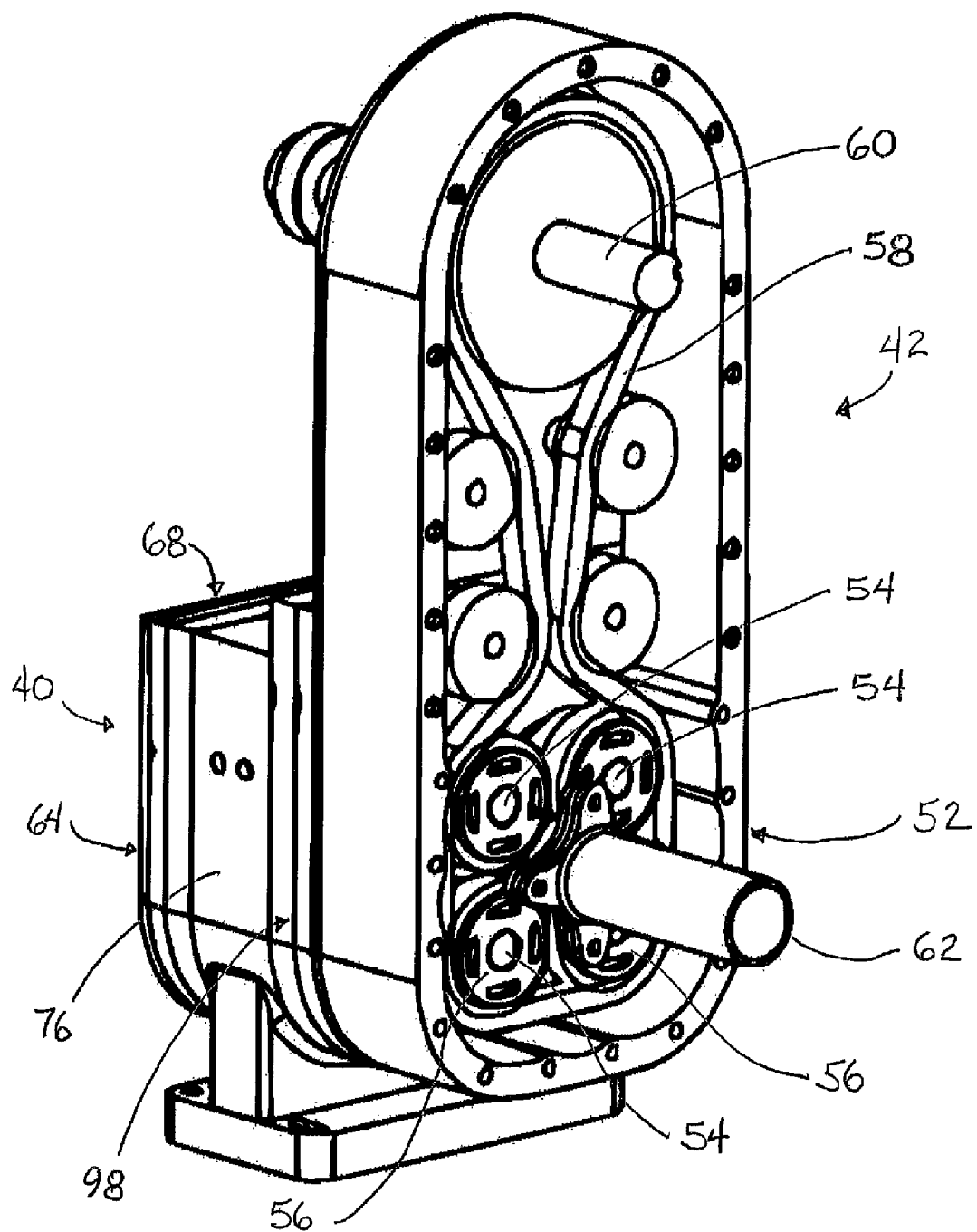
FIG. 1 is an exhaust side perspective view of a planetary rotary engine in accordance with the present invention to which is attached a drive system.

The present invention is shown embodied in a planetary rotary engine, illustrated at 40 in FIG. 1, which is shown connected to a drive system 42. As described in detail below, engine 40 includes multiple rotors 44 and a charge compression system for compressing a charge of air and/or an air and fuel mixture that is precompressed by rotation of the rotors 44 and supplied into a combustion chamber 46 of engine 40 for improving the power density. A compressed air charge may alternatively or additionally be supplied into an exhaust system or manifold of engine 40 for reducing emissions. Engine 40 also includes a compression insert member 48 located within combustion chamber 46 that occupies both a portion of the combustion chamber 46 volume and provides rigidity to engine 40. Compression insert 48 is sized and shaped to occupy all or nearly all of the volume between rotors 44 at their position corresponding to minimum volume of combustion chamber 46, thereby effectively raising the compression ratio of engine 40. Compression insert 48 mounts to both end walls of engine 40 to compensate for combustion forces within engine 40. Still further, engine 40 may additionally include actively adjustable rotary valve assemblies 50, 150 for the intake and/or exhaust valve ports of engine 40. Adjustable rotary valve assemblies 50, 150 enable the timing and/or duration of the intake and exhaust events to be selectively varied, such as based on engine RPM and/or load, thereby further improving the performance of engine 40.

Referring now to FIG. 1, engine 40 includes an exhaust side 52 to which drive system 42 is mounted. The illustrated engine 40 includes four separate rotors 44 mounted on separate shafts 54. Drive gears 56 are mounted to shafts 54, with a drive belt or chain 58 disposed about gears 56 to power a drive output shaft 60. An exhaust manifold 62 that is in communication with combustion chamber 46 of engine 40 extends away from drive system.

Figure 2:
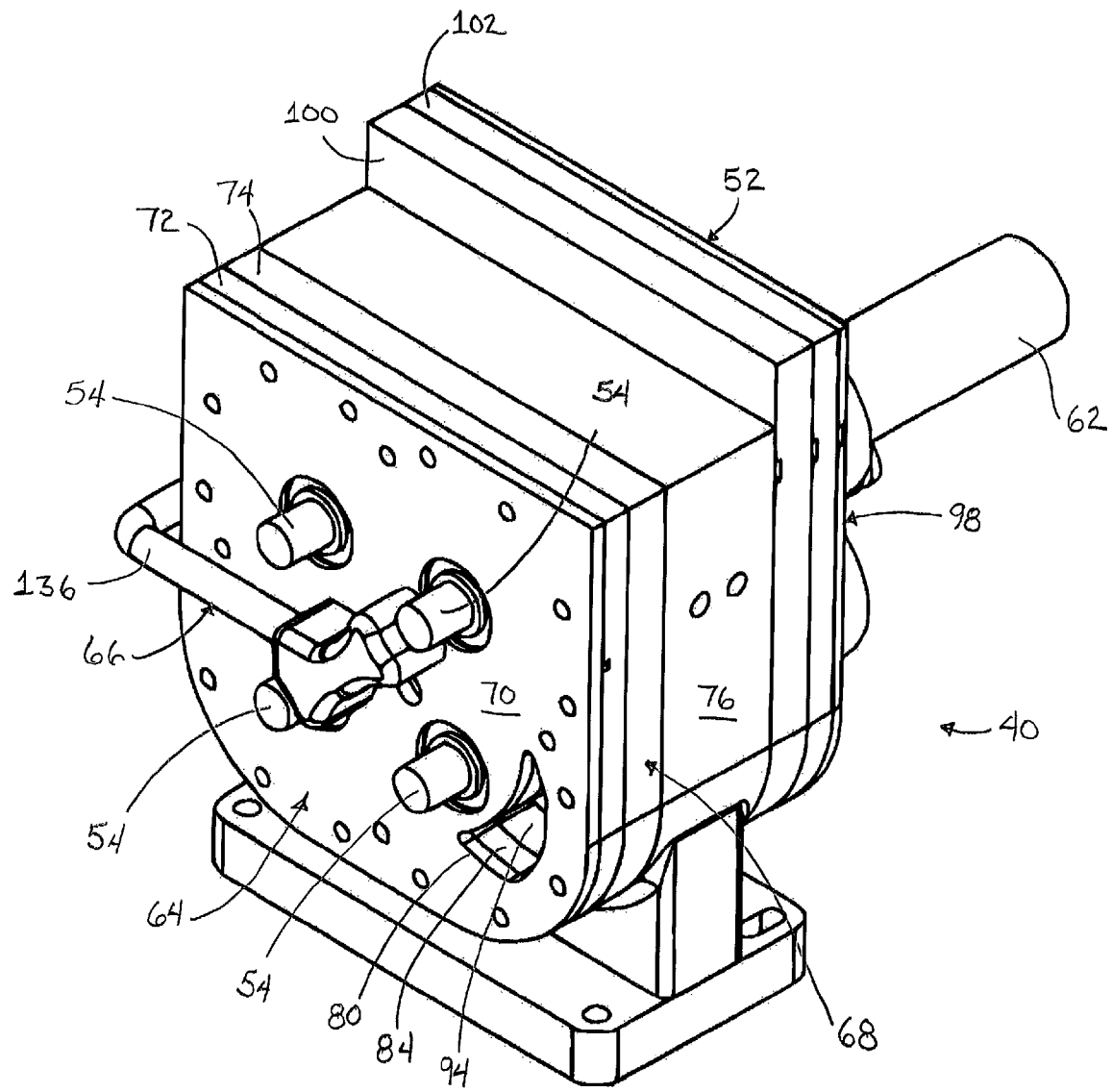
FIG. 2 is an intake side perspective view of the planetary rotary engine of FIG. 1 shown with the drive system removed.
Figure 2A:
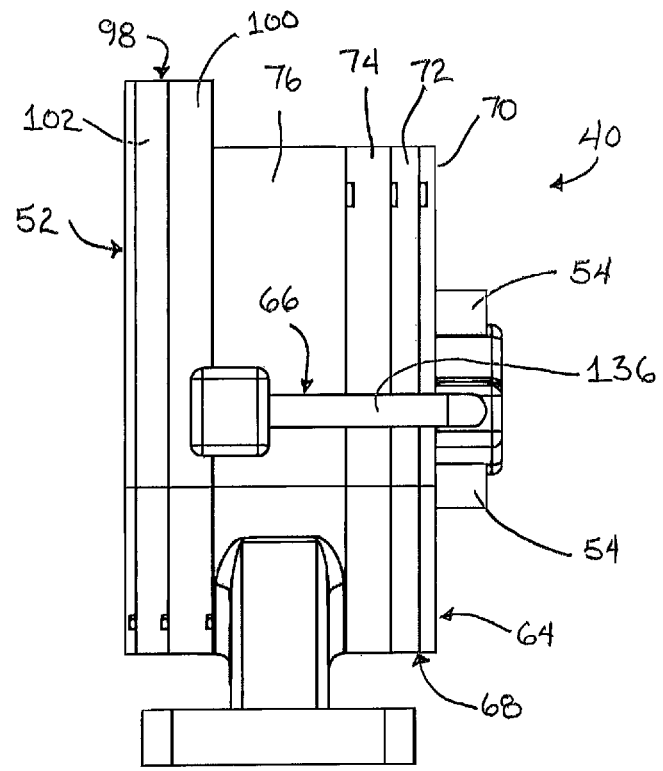
FIG. 2A is a side plan view of the planetary rotary engine of FIG. 2 shown with the exhaust manifold removed and disclosing the charge manifold extending between the housing block and the intake side.
Figure 4:
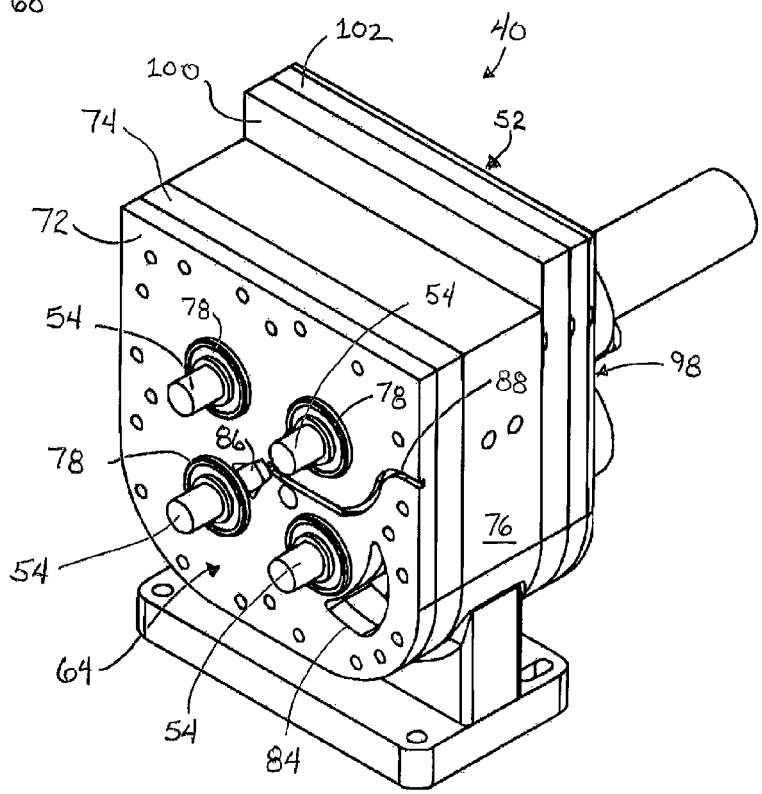
FIG. 4 is an intake side perspective view of the planetary rotary engine of FIG. 3 showing the charge manifold fully removed and the cover plate removed.

The intake side 64 of engine 40 is shown in FIG. 2, which side includes a charge intake manifold 66 and discloses the opposite ends of rotor shafts 54. Intake side 64 of engine 40 includes an intake end wall which in the illustrated embodiment comprises an intake end wall assembly 68 detailed in FIGS. 2-6. Intake end wall assembly 68 includes an intake cover plate 70, an intake bearing plate 72, and an intake valve plate 74 mounted to a housing block 76 of engine 40. Bearings 78 mounted on rotor shafts 54 are retained in bearing plate 72 for each shaft 54. Intake cover plate 70 includes a charge precompression or compression intake port 80 for allowing a charge of air or air and fuel mixture to be delivered into engine 40 for the charge compression system described below, as well as intake valve ports 82a, 82b through which air and/or air and fuel are delivered into combustion chamber 46 of engine 40. Bearing plate 72 also includes a charge precompression or compression intake port 84 that aligns with compression intake port 80 of intake cover plate 70, and includes intake ports 86 (one shown in FIG. 4) that align with intake ports 82 of intake cover plate 70. Bearing plate 72 also includes a channel 88 for an insulated spark plug wire for the positive electrode of the ignition system (not shown).

Figure 5:
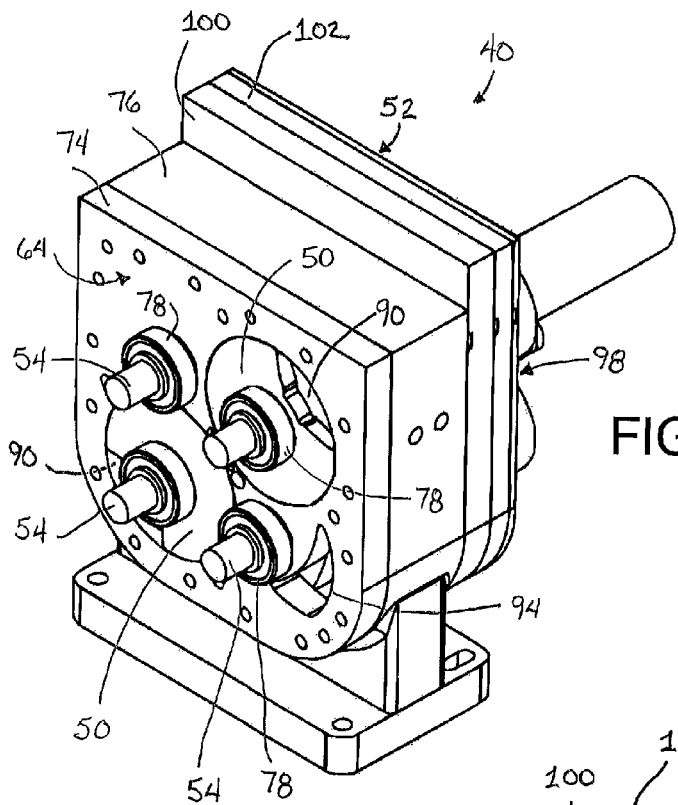
FIG. 5 is an intake side perspective view of the planetary rotary engine of FIG. 4 shown with the bearing plate removed and disclosing a pair of actively variable rotor valves in accordance with an aspect of the present invention.
Figure 6:
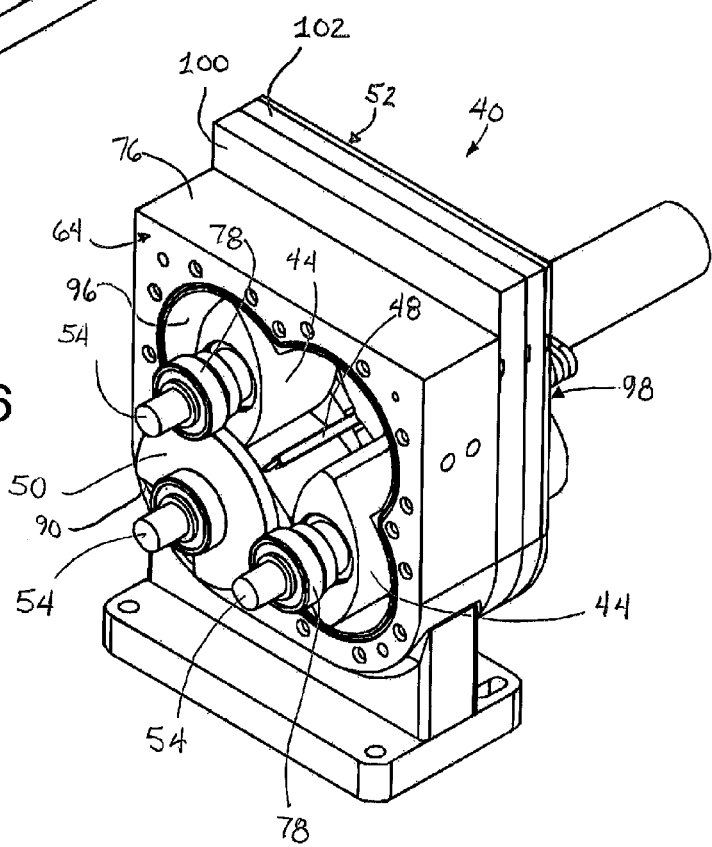
FIG. 6 is an intake side perspective view of the planetary rotary engine of FIG. 5 showing the valve plate removed and a single rotor and rotor valve removed to disclose a compression insert in accordance with an aspect of the present invention.
Figure 8:
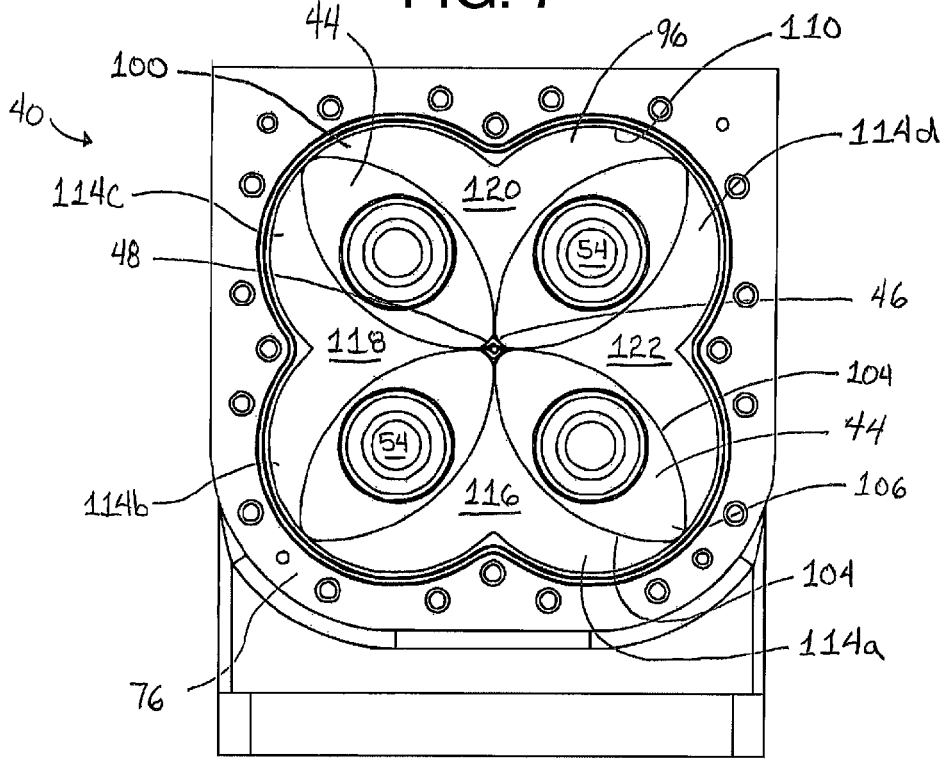

As shown in FIG. 5, intake valve plate 74 supports a pair of rotary intake valves 50a, 50b, each of which are mounted to separate rotor shafts 54 and include valve openings 90a, 90b. As described in more detail below, rotary intake valves 50 selectively open intake ports 92a, 92b (FIG. 9) on valve plate 74 to allow the charge to be delivered into combustion chamber 46 of engine 40, with the intake ports 92 of valve plate 74 being aligned with the intake ports 86 of bearing plate 72. Valve plate 74 further includes a charge precompression or compression intake port 94 for allowing a charge of air or air and fuel mixture to be delivered into engine 40 for the charge compression system, with intake port 94 of valve plate 74 aligning with intake port 84 of bearing plate 72. As shown in FIGS. 6 and 8, engine 40 includes four rotors 44 within housing chamber 96 of housing block 76, with compression insert 48 installed centrally of rotors 44. Although not shown, engine 40 also includes an air filter system and fuel delivery system, which systems may be operatively connected to a separate intake manifold or to charge intake manifold 66, and/or may be connected to cover plate 70 at intake port 80 to supply air and/or fuel through intake port 80. Fuel may be mixed with air prior to delivery into the combustion chamber, or may alternatively be directly injected into the combustion chamber.

Exhaust side 52 of engine 40 includes an exhaust end wall which in the illustrated embodiment comprises an exhaust end wall assembly 98 including an exhaust valve plate 100 and an exhaust bearing plate 102. Exhaust valve plate 100 is mounted to housing block 76 such that housing block 76 is sandwiched between intake valve plate 74 and exhaust valve plate 100. As described in detail below, exhaust valve plate 100 may be substantially similar to intake valve plate 74 and include a pair of rotary exhaust valves (not shown), each of which is mounted to separate rotor shafts 54 to which intake valves 50 are mounted such that each rotor shaft 54 supports a separate valve, with the exhaust valves and intake valves 50 being substantially similar as described below. Exhaust valve plate 100 includes exhaust ports 108 that are selectively opened and closed by exhaust valves for discharging combustion gasses from combustion chamber 46 of engine 40.

Figure 7:
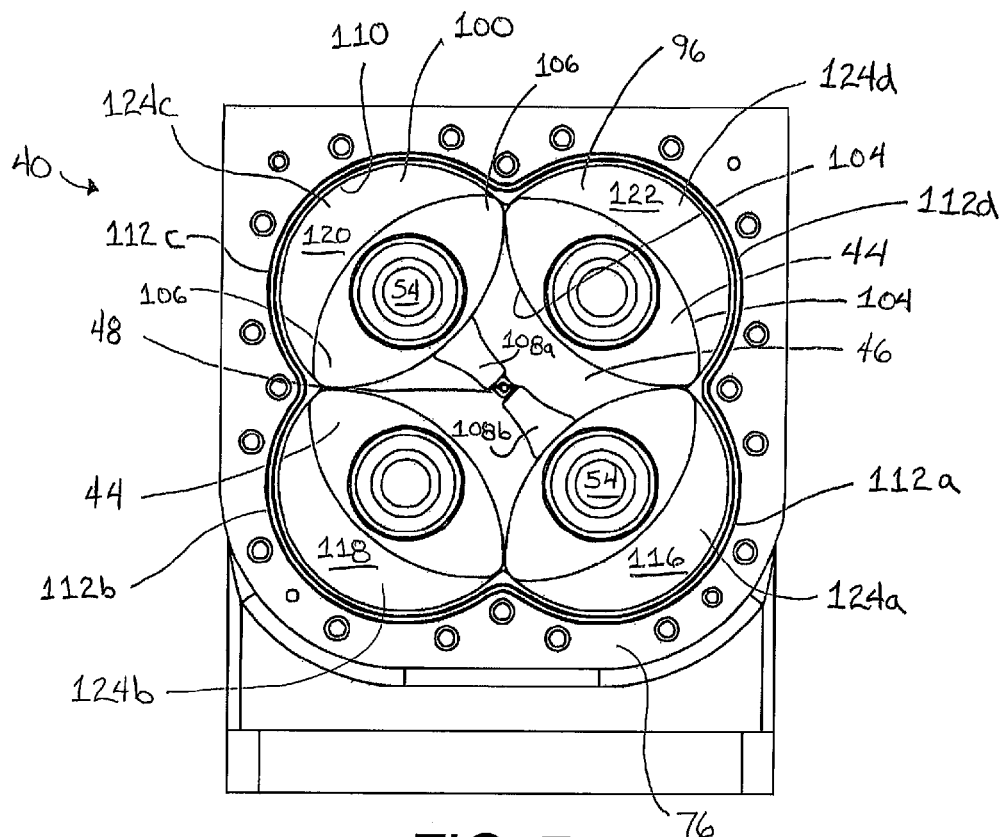
FIGS. 7 and 8 are plan views of the planetary rotary engine of FIG. 2 viewed from the intake side shown with the intake wall removed and disclosing an orientation of the four rotors where the internal combustion chamber is maximized and the four outer volumes corresponding to the outer chambers are minimized (FIG. 7) and a rotor orientation where the inner combustion chamber volume is minimized and the four outer chamber volumes are maximized (FIG. 8)

Referring now to FIGS. 7 and 8, rotors of engine 40 have an elliptical cross sectional profile and opposite sidewalls 104. Each rotor 44 includes two distally opposed lobes 106 along the long axis of the rotor profile. Also shown is exhaust valve plate 100 mounted to the back of housing block 76 and the exhaust valve ports 108a, 108b of exhaust valve plate 100, with the compression insert 48 centered between exhaust valve ports 108. Housing block 76 includes an internal sidewall 110 such that housing chamber 96 is defined by intake valve plate 74, exhaust valve plate 100, and internal sidewall 110 of housing block 76.

In operation rotors 44 all rotate in the same direction that being clockwise viewed from the orientation of FIGS. 7 and 8. In the illustrated embodiment, internal sidewall 110 of housing block 76 includes four outer chamber wall portions 112a, 112b, 112c, 112d (FIGS. 7 and 9) that are each approximately semicircular and rotors 44 are sized and located within housing chamber 96 whereby lobes 106 rotate in substantial proximity, either near or actual slight contact, to respective chamber wall portions 112 and to sidewalls 104 of adjacent rotors 44. As understood from FIG. 7, for at least a portion of the rotation of a given rotor 44, both rotor lobes 106 of a given rotor 44 are simultaneously in proximity with the corresponding chamber wall portion 112.

Housing chamber 96 is subdivide into four overlapping rotor chambers or chamber portions 114a, 114b, 114c, 114d (FIGS. 8 and 9) that are partially defined by respective chamber wall portions 112, with each rotor 44 rotating within a separate rotor chamber 114. Along with intake valve plate 74 and exhaust valve plate 100, rotors 44 define an inner chamber, which is a combustion chamber 46 in the illustrated embodiment, having an inner chamber volume. Intake valve plate 74, exhaust valve plate 100, outer chamber wall portions 114 and the portions of rotors 44 not exposed to combustion chamber 46 define four outer chamber volumes 116, 118, 120, 122. The volume of inner chamber 46 and outer chamber volumes 116, 118, 120, 122 alternatingly increase and decrease in volume during rotation of rotors 44, The volume of inner chamber 46 is maximized when the rotors 44 are oriented with their long axes orthogonal relative to one another, such as substantially as shown in FIG. 7, in which orientation the four outer chamber volumes 116, 118, 120, 122 are minimized. In this orientation the lobes 106 of each rotor 44 are simultaneously in substantial proximity to the corresponding outer chamber wall portion 112 and four outer chambers 124a, 124b, 124c, 124d (FIGS. 7 and 9) are defined between intake valve plate 74, exhaust valve plate 100, outer chamber wall portions 112 and a corresponding rotor 44. Conversely, the volume of inner chamber 46 is minimized and the four outer chamber volumes 116, 118, 120, 122 are maximized when the long axes of diagonally opposed rotors 44 are aligned (FIG. 8).

I.

Referring now to FIGS. 9-15, which illustrates engine 40 from the opposite direction relative to FIGS. 7 and 8, compression intake port 94 of intake valve plate 74 is shown relative to rotor chamber 114a and outer chamber 124a and intake ports 92 are shown relative to inner chamber 46. Also shown is a transfer port 126 at rotor chamber 114b extending from chamber wall portion 112b through housing block 76 to charge manifold 66. Compression insert 48 includes a mounting head 128 that is recessed within intake valve plate 74 as described below. In the combustion engine embodiment illustrated, compression of an air and fuel charge within the combustion chamber 46 takes place during the 90 degree rotation of rotors 44 from the orientation of FIG. 9 to the orientation of FIG. 12, subsequent combustion of that air and fuel charge drives the rotors.

Figure 9:
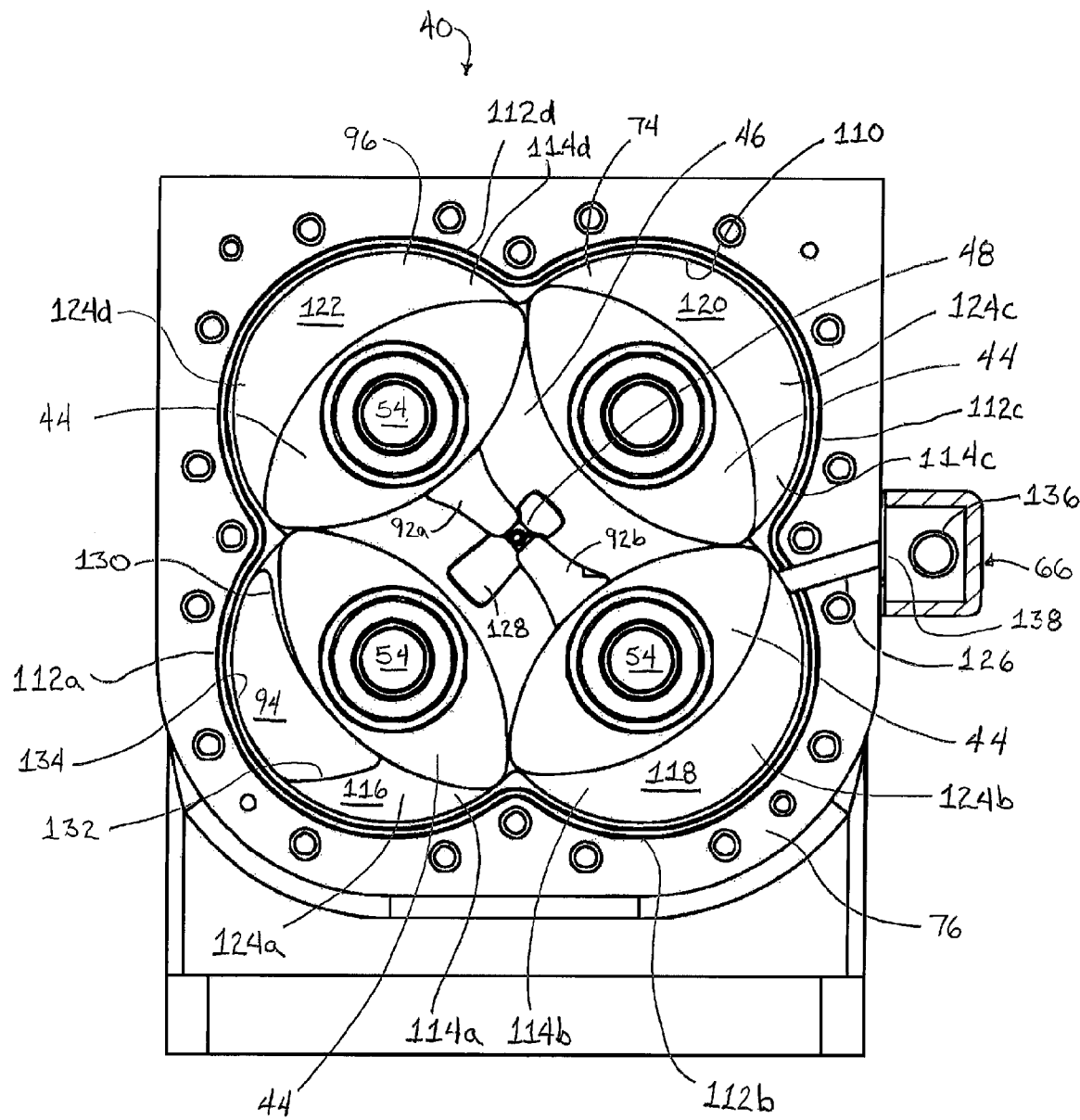
FIGS. 9-15 are plan views of the planetary rotary engine of FIG. 2 viewed from the exhaust side shown with the exhaust end wall removed and illustrating the rotors at various rotated positions within the housing chamber.
Figure 10:
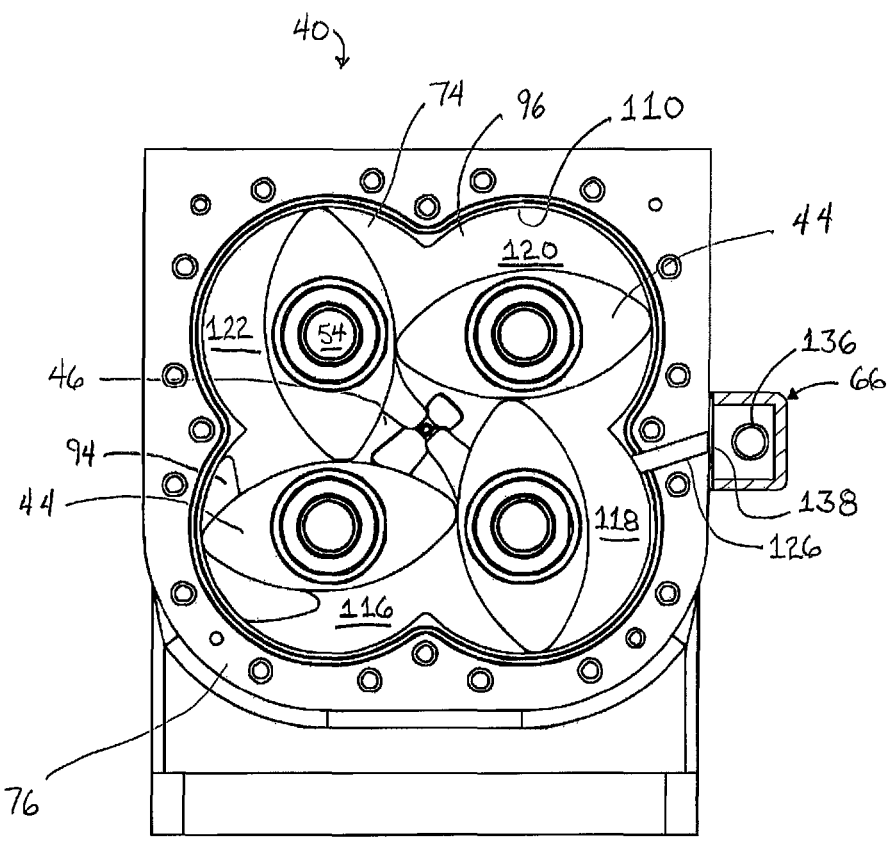
Figure 11:
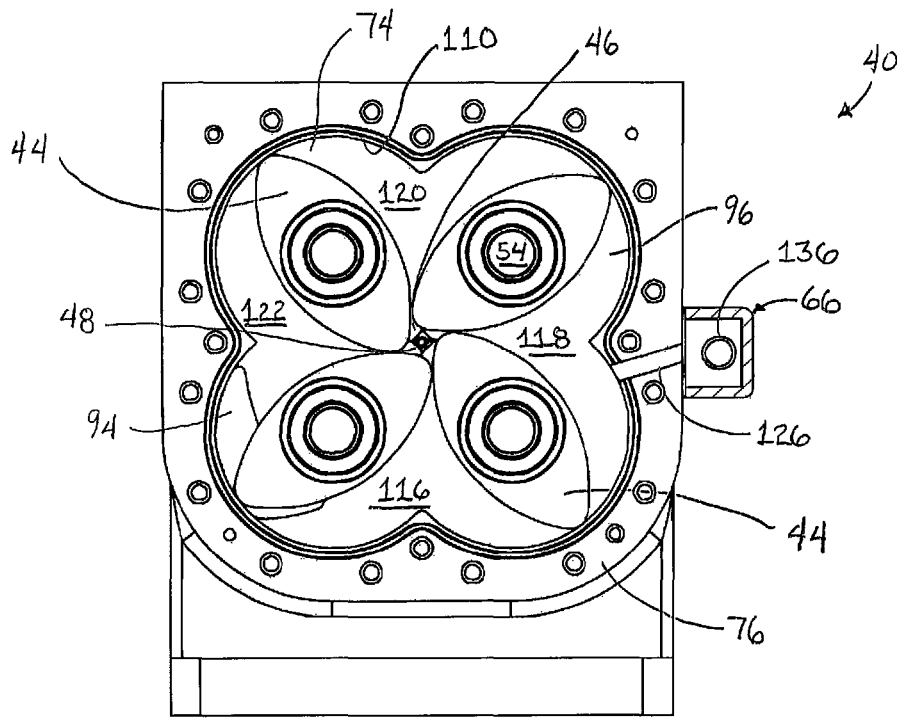

In the illustrated embodiment, with reference to FIG. 9, precompression intake port 94 of intake valve plate 74 includes three arced port edges 130, 132, 134 with precompression intake port 94 defining an opening covering a substantial portion of the face of intake valve plate 74 within the area circumscribed by outer chamber 124a at FIG. 9. A first port edge 130 corresponds to the profile of rotor sidewall 104 when rotor 44 is approximately in the orientation of FIG. 9. A second port edge 132 extends from the first port edge 130 to chamber wall portion 112a. As understood from FIGS. 11 and 12, second port edge 132 corresponds to the profile of rotor sidewall 104 when rotor 44 is rotated to the orientation of FIG. 12. The third port edge 134 corresponds to the profile of chamber wall portion 112a and extends between first port edge 130 and second port edge 132. Thus, precompression intake port 94 is substantially fully opened to outer chamber 124a when rotor 44 is in the orientation of FIG. 9, and is substantially closed to outer chamber volume 116 by rotor 44 when rotor is in the orientation of FIG. 12. In the illustrated embodiment precompression intake port 94 defines an opening covering over fifty-percent of the face of intake valve plate 74 within the area circumscribed by outer chamber 124a in the orientation of FIG. 9.

When the long axes of rotors 44 are substantially orthogonal relative to each other, such as substantially shown in FIG. 9, outer chamber volumes 116, 118, 120, 122 are minimized and the volume of inner chamber 46 is maximized. As the rotors 44 are rotated from the orientation of FIG. 9 (counterclockwise in the orientation of FIGS. 9-15), outer chamber volumes 116, 118, 120, 122 expand while the volume of inner chamber 46 is compressed. A charge is drawn through precompression intake port 94, as well as precompression intake ports 80 and 84, and into outer chamber volume 116 as outer chamber volume 116 expands via the rotation and interaction of rotors 44 of the rotor chambers 114a, 114b. Precompression intake port 94 is closed by rotor 44 relative to outer chamber volume 116 substantially simultaneously with the point at which outer chamber volume 116 reaches its maximum volume, which occurs via a rotation of approximately 90 degrees in the illustrated embodiment from FIG. 9-FIG. 12. The expansion of outer chamber volume 116 promotes the drawing of a charge through compression intake port 94 into outer chamber volume 116. Subsequent rotation of rotors 44 over an additional 90 degrees with precompression intake port 94 closed to outer chamber volume 116, such as illustrated in FIGS. 12-15, causes the charge to be progressively compressed until the long axes of rotors 44 are again orthogonally aligned (such as approximately shown in the orientation of FIG. 15), at which time the compressed charge within outer chamber volume 116 is contained in outer chamber 124b. This compressed charge may alternatively be referred to as a precompressed charge as it is compressed prior to being introduced into combustion chamber 46 when the volume of combustion chamber 46 is approximately maximized, whereat the charge will undergo further compression prior to combustion.

Figure 14:
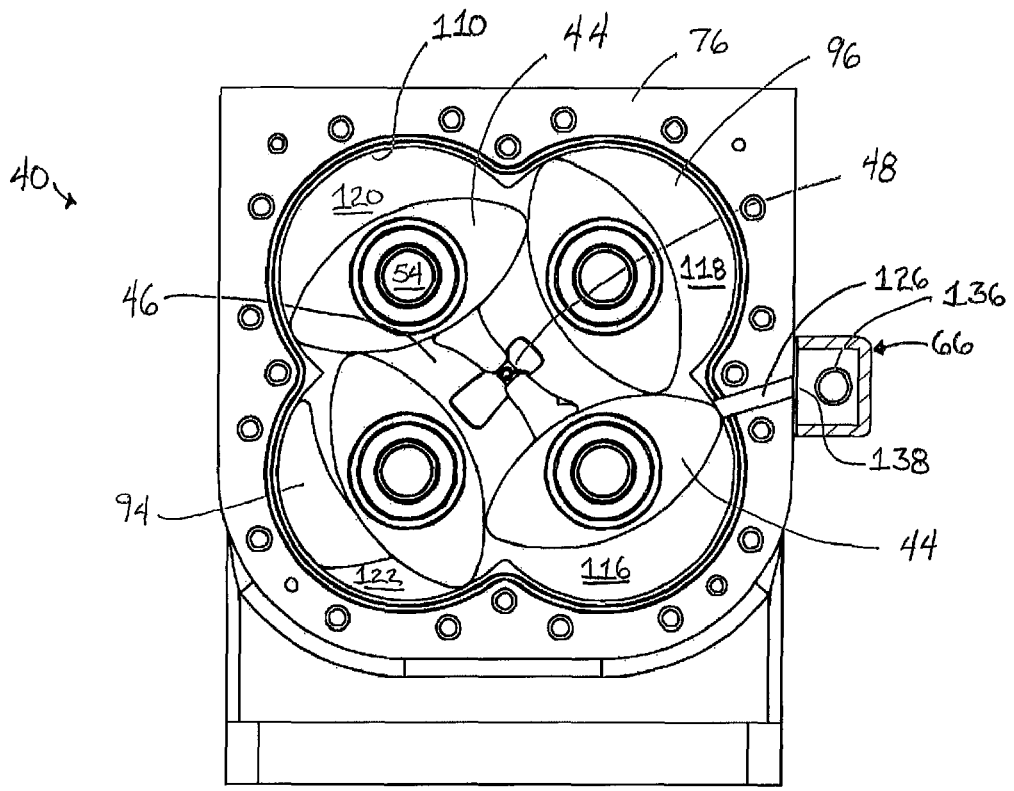
Figure 15:
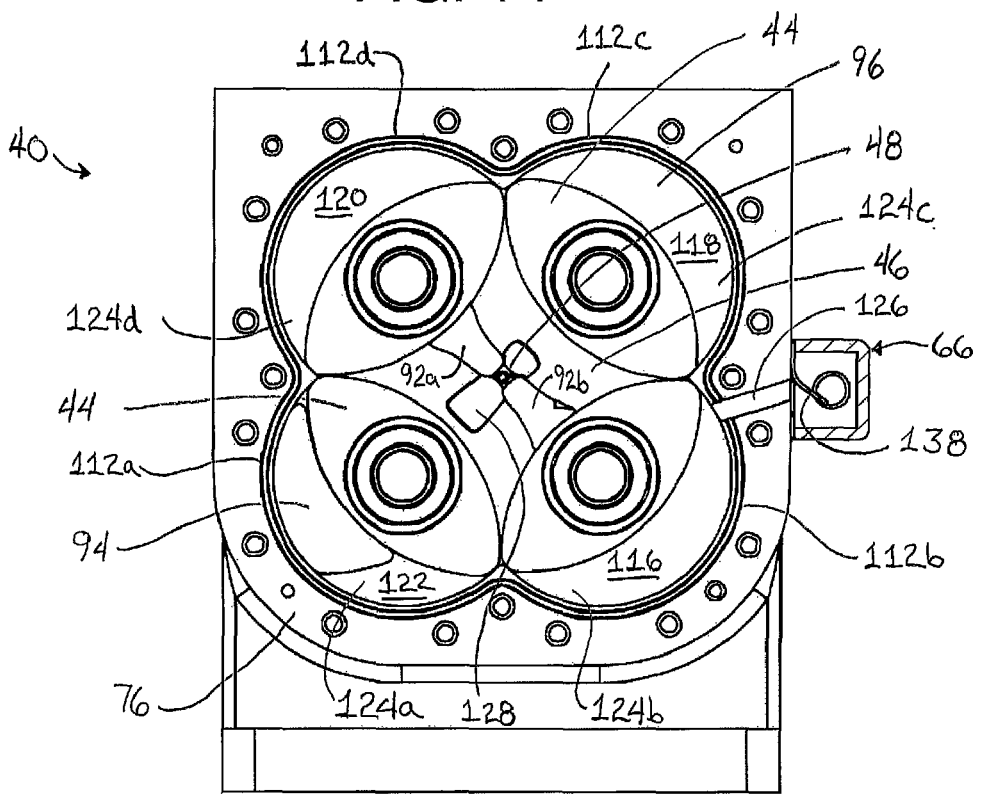

Referring now to FIGS. 14 and 15, it will be understood that once the rotor 44 of rotor chamber 114b rotates beyond transfer port 126 the compressed charge will be discharged from housing chamber 96 through transfer port 126 and into charge manifold 66. As understood from FIGS. 2-3 and 9-15, charge manifold 66 extends between transfer port 126 and intake side 64 of engine 40 and includes a plenum 136 for delivering the compressed charge generated by engine 40 to the intake ports 82, 86, 92 of engine 40. As described in detail below, the compressed charge is then selectively supplied into combustion chamber 46 of engine 40 through rotary intake valves 50. As such, a charge of greater density will be supplied into combustion chamber 46 as compared to the supplying of air at atmospheric pressure. A one way valve, illustrated as a reed valve 138 at FIG. 15, allows the precompressed charge to exit housing chamber 96 and prevents reverse flow back into housing chamber 96 such that the pressure within manifold 66 may remain elevated. Alternative pressure-based one-way valves or a rotary valve, similar to the rotary valves discussed herein, may be used to block the transfer port 126 and prevent reflux. Although not shown, such valves may likewise be placed at any or all of compression intake ports, with the valves oriented to prevent reverse flow out of compression intake ports.

Fuel may be added to the air prior to passage through the precompression intake port 94 to form the air-fuel mixture or charge or fuel may be directly injected into the central chamber 46 as the precompressed air is introduced into the central chamber 46 via a fuel injection port. Still further, fuel may be injected into the outer chamber volume 116 that is undergoing compression.

Figure 12:
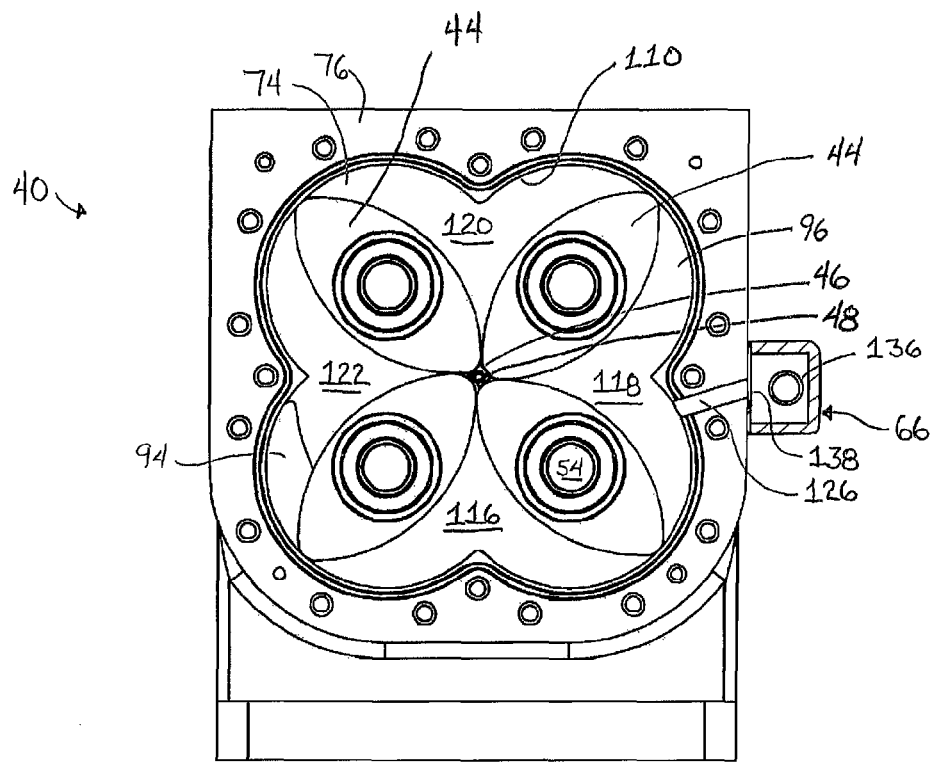
Figure 13:
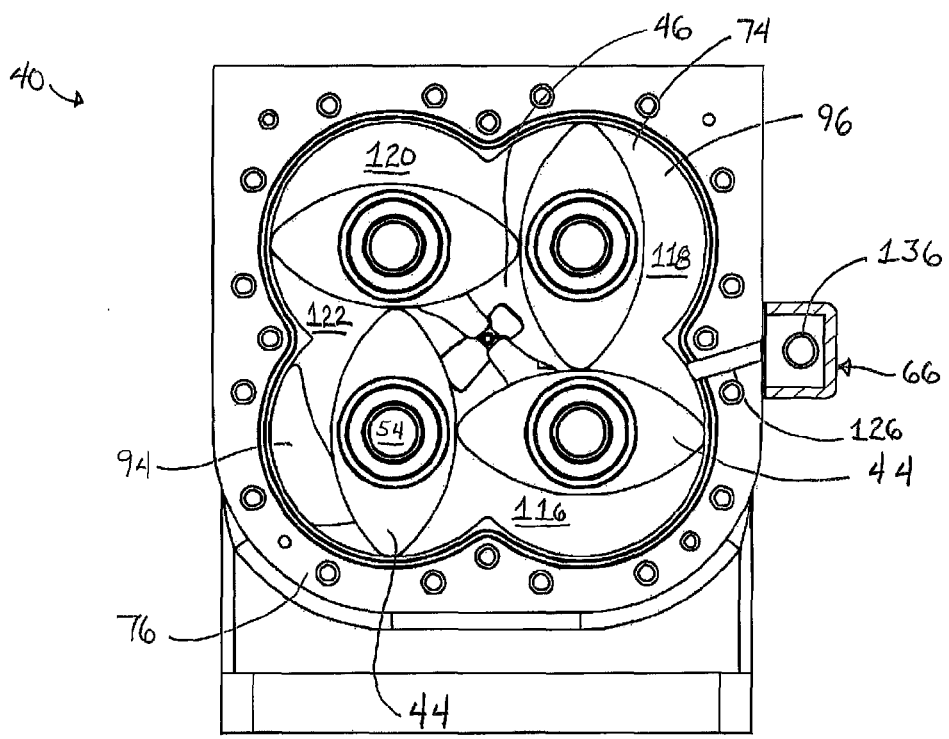

Engine 40 is a four-stroke system in which a combustion event occurs every 360 degree revolution of rotors 44, with combustion occurring when rotors 44 are oriented at or near the minimum volume of inner chamber 46 when rotors 44 are oriented as shown in FIG. 12. A charge precompression cycle as illustrated and described above, however, occurs over a 180 degree rotation of rotors 44 as described above in connection with FIGS. 9-15. Accordingly, two precompression cycles occur during every 360 degree revolution of rotors 44. Thus, the precompression charges generated may be stored within charge manifold 66 prior to delivery into combustion chamber 46, with the charge being delivered when the valve opening 90 are exposed to valve ports 92, as discussed in further detail below, with the precompressed charge generally being delivered when the volume of combustion chamber 46 is approximately at a maximum. Alternatively, however, the precompression system could be employed in a two-stroke system in which a combustion event occurs every 180 degree revolution of rotors, in which case the rotary valve would include two valve openings that expose the intake port twice during every revolution to allow a single precompressed charge to be delivered into the combustion chamber.

FIGS. 9-15 depict one precompression intake port 94 and one transfer port 126 at adjacent rotor chambers 124a, 124b. It should be understood that rotor chambers 124c and 124d could also be configured to operate as a precompression system in the manner of rotor chambers 124a and 124b. For example, rotor chamber 124c could include an intake port and rotor chamber 124d could include a transfer port, with an additional charge manifold system provided to supply the precompressed charges from such an additional system to combustion chamber 46. In such an arrangement, two precompressed charges would be generated for every 180 degree revolution of the rotors from FIGS. 9 to 15.

Figure 15A:
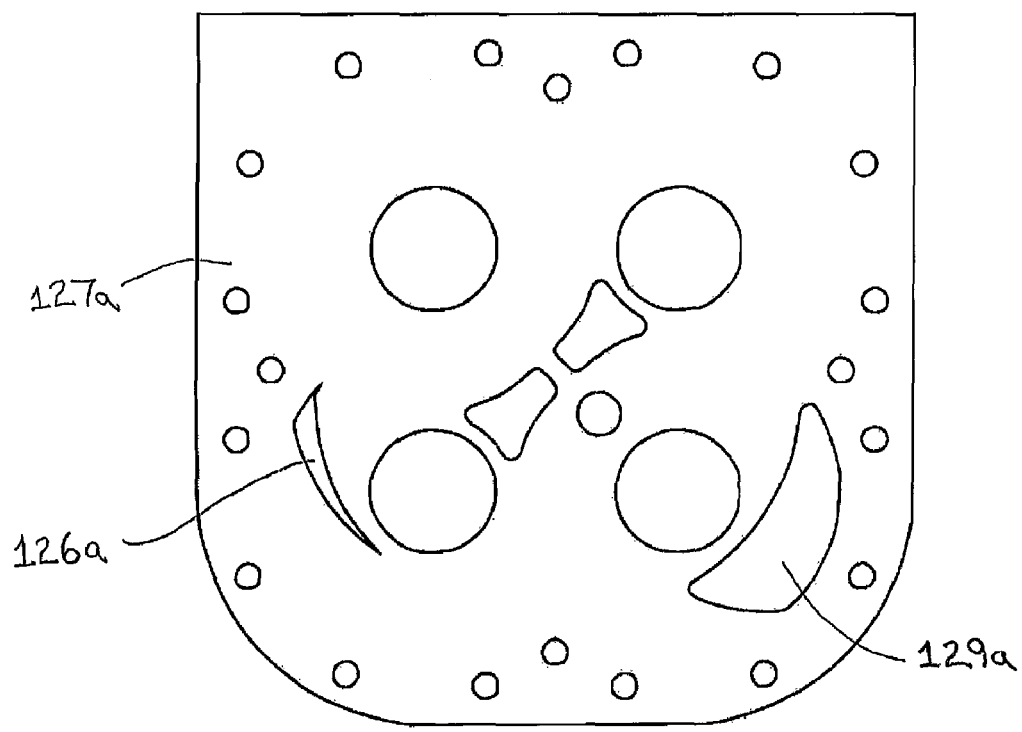
FIG. 15A is a plan view of an alternate intake end wall member disclosing an alternative transfer port configuration.
Figure 15B:
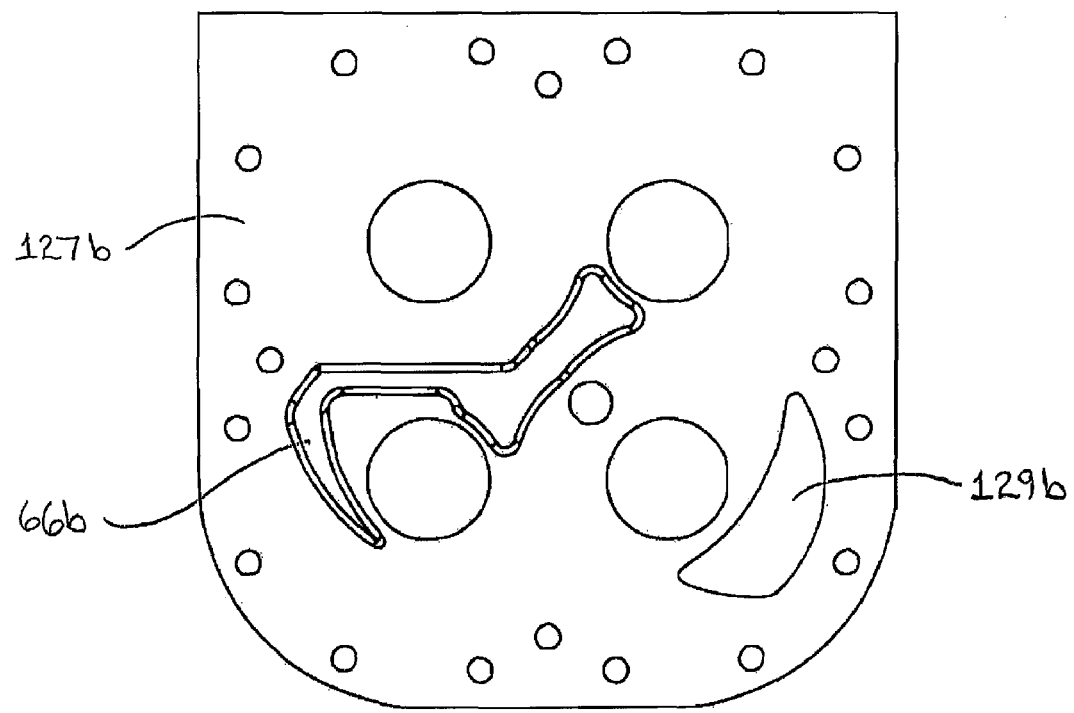
FIG. 15B is a plan view of an alternate intake end wall cover plate disclosing an alternative charge manifold.

Alternatively shaped, configured, and located compression intake ports and transfer ports may be employed. For example, alternative intake ports may be arranged on either end wall, and/or may be arranged on the interior sidewall of housing block. With reference to FIGS. 15A and 15B, for example, an alternatively shaped transfer port 126a may be arranged on an intake end wall member 127a, with transfer port 126a configured to have an arced profile conforming to a sidewall of a rotor in generally similar manner to compression intake port 129a shown and compression intake port 94 discussed above, with transfer port 126a having a smaller cross sectional area but being selectively exposed and covered by a rotor. In this embodiment, cover plate member 127b includes an intake port 129b and an alternative charge manifold 66b formed over transfer port 126a, with charge manifold 66b delivering the precompressed charge supplied through transfer port 126a to the combustion chamber.

Figure 2B:
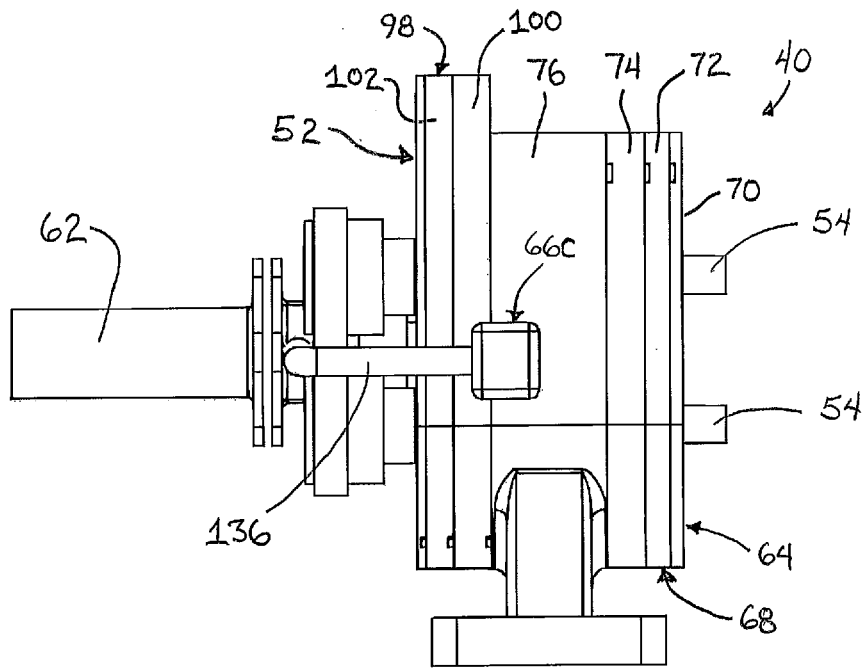
FIG. 2B is a side plan view of the planetary rotary engine of FIG. 2 shown with an alternate charge manifold extending between the housing block and the exhaust manifold.
Figure 3:
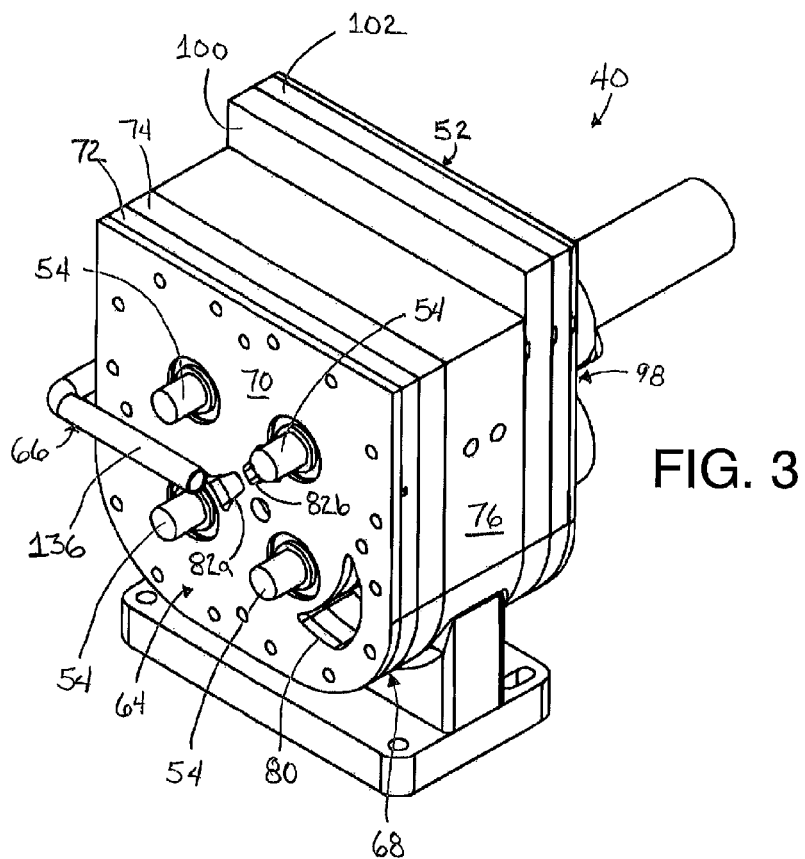
FIG. 3 is an intake side perspective view of the planetary rotary engine of FIG. 2 shown with a portion of the charge manifold removed disclosing intake ports on the cover plate.

Still further, with reference to FIG. 2B, engine 40 may utilize an alternative charge manifold 66c connected to exhaust manifold 62, such as by connecting plenum 136 to exhaust manifold 62 as shown, with the precompressed charge comprising compressed air without a fuel mixture to increase the purity of emissions. A compressed air charge generated as described above may be injected at least in part into the exhaust flow leading to a decrease in unburned hydrocarbon emissions and a reduction in carbon monoxide. If an oxidizing catalyst catalytic converter is employed, the injected fresh air may improve the efficiency of the catalyst. An alternative engine may include two charge precompression systems in the manner described with one for delivering a precompressed charge to the combustion chamber and the other delivering a precompressed charge to an exhaust manifold.

II.

Figure 16:
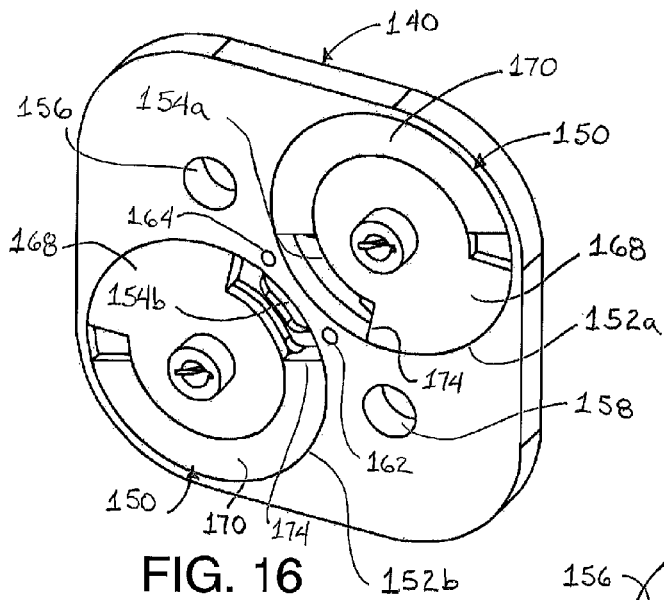
FIG. 16 is a top perspective view of a valve plate disclosing two actively variable rotary valves in accordance with an aspect of the present invention.
Figure 17:
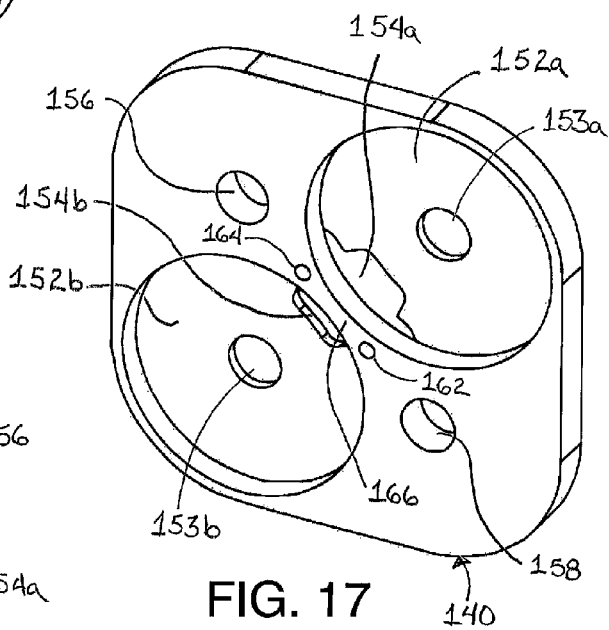
FIG. 17 is a perspective view of the valve plate of FIG. 16 shown with the rotary valves removed.
Figure 18:
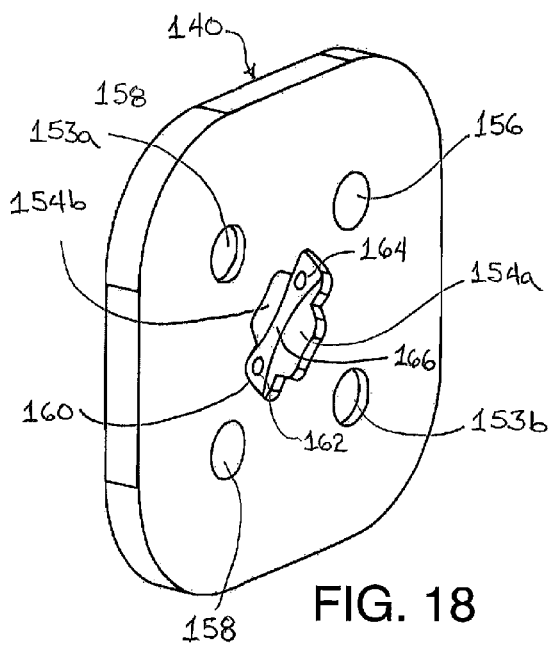
FIG. 18 is an interior side perspective view of the valve plate of FIG. 17.

Referring now to FIGS. 16-18, an intake valve plate 140 including two alternative rotary intake vales or valve assemblies 150 is illustrated for use with engine 40. As described, engine 40 includes an intake valve plate and an exhaust valve plate 100. Intake and exhaust valve plates are substantially similar and mounted to either side of housing block 70. As such, when assembled with rotary valves an intake valve plate includes two diagonally opposed rotary valves operating as intake rotary valves and an exhaust valve plate includes two diagonally opposed rotary valves operating as exhaust rotary valves, with each rotor shaft supporting a separate rotary valve assembly. It should be understood that the following discussion regarding intake valve plate 140 and rotary intake valves 150 is exemplary due to the similarities of intake and exhaust valve plates and intake and exhaust valves, with certain exceptions noted.

Rotary intake valves 150 are mounted or constrained for rotary motion within cavities or wells or receptacles 152a and 152b on intake valve plate 140. Cavity 152a includes an intake port or valve port 154a and cavity 152b includes an intake port or valve port 154b, with valve ports 154a, 154b enabling flow into combustion chamber 46 through rotary valves 150. Cavities 152a, 152b also include holes 153a, 153b for receiving collars (discussed below) of valves 150 and rotor shafts 54. Valve ports 154a and 154b are centrally oriented such that they align with a combustion chamber 46 when mounted to engine 40. Valve plate 140 further includes holes 156, 158 for rotor shafts 54. The interior side of valve plate 140 (FIG. 18) includes an insert cavity or recess 160 between valve ports 154a, 154b for receiving mounting head 128 of compression insert 48 such that mounting head 128 of compression insert 48 is flush with the interior side of valve plate 140 whereby rotors 44 are able to rotate beneath mounting head 128. Valve plate 140 further includes a pair of mounting holes 162, 164 for receiving threaded fasteners to secure mounting head 128 of compression insert 46 against bridge 166 within insert cavity 160. The illustrated compression insert 46 described below includes a single mounting head 128 such that a corresponding intake valve plate 140 would not require an insert cavity 160.

Valve ports 154 may be sized and shaped based on engine configuration, as well as based on whether the ports are intake or exhaust ports. As understood from FIG. 9, for example, valve ports 92a, 92b include arced edges corresponding to the outer circular profile circumscribed by the lobes 106 of rotors 44 to which rotary valve assemblies 50 are not attached.

With further reference to FIGS. 19-25, each rotary valve 150 includes two mating valve disks 168 and 170 that are mounted to a rotor shaft 172 for a given rotor such that valve disks 168, 170 rotate with rotation of rotor shaft 172. Valve disks 168 and 170 cooperatively define a rotating valve opening 174, which opening 174 is rotated over the valve port 154 associated with the cavity 152 within which the rotary valve 150 is mounted during rotation of rotary valve 150 to enable flow through the valve port 154. In general, in the four-stroke embodiment, rotary intake valves 150 are timed to be open (with the intake valve opening 174 aligned with the intake valve port 154) to allow a charge to be delivered into combustion chamber 46 during volume expansion of combustion chamber 46 and rotary exhaust valves (not shown) are timed to be open (with the exhaust valve opening aligned with the exhaust valve port) to allow combustion gasses to be expelled from the combustion chamber during volume contraction of combustion chamber 46. A two-stroke arrangement would employ two valve openings per rotary valve, which valves could likewise be configured as active variable valves.

Rotary valve 150 is provided with a mechanical linkage to rotor shaft 172 to impart selective relative rotational movement of valve disk 168 and/or valve disk 170 on rotor shaft 172. As described in detail below, this selective relative rotational movement via the mechanical linkage enables variable valving of engine 40 to be obtained by selectively actively adjusting the angular size or area of valve opening 174 and/or the relative orientation of valve opening 174 on the rotor shaft 172 based on engine RPM and/or load to maximize the efficiency or performance of engine 40.

Valve disk 168 includes a circular base portion 176 with a centrally located collar 178 having a mounting opening 180 for receiving rotor shaft 172. A pair of helical grooves 182a, 182b are formed along the inner wall of collar 178 at mounting opening 180. Valve disk 168 also includes an arcuate or arced portion 184 extending from the periphery of base portion 176, with arced portion 184 including opposed end shoulders 186, 188 and a central shoulder 190 formed by an offset in the thickness of arced portion 184.

Valve disk 170 is substantially circular, but includes an arcuate or arced gap 192 over a portion of the periphery of valve disk 170, with end shoulders 194, 196 formed at either end of arced gap 192. Valve disk 170 further includes a well or cavity or receptacle 198, as well as a collar 200 having a mounting opening 202 for receiving rotor shaft 172. A pair of helical grooves 204a, 204b are formed along the inner wall of collar 200 at mounting opening. Valve disk 168 is configured to be received within cavity 198 with arced portion 184 positioned within arced gap 192, with valve disks 168 and 170 being able to rotate relative to each other. When valve disks 168 and 170 are assembled together, valve opening 174 is defined between shoulder 188 of disk 168 and shoulder 194 of disk 170.

Figure 19:
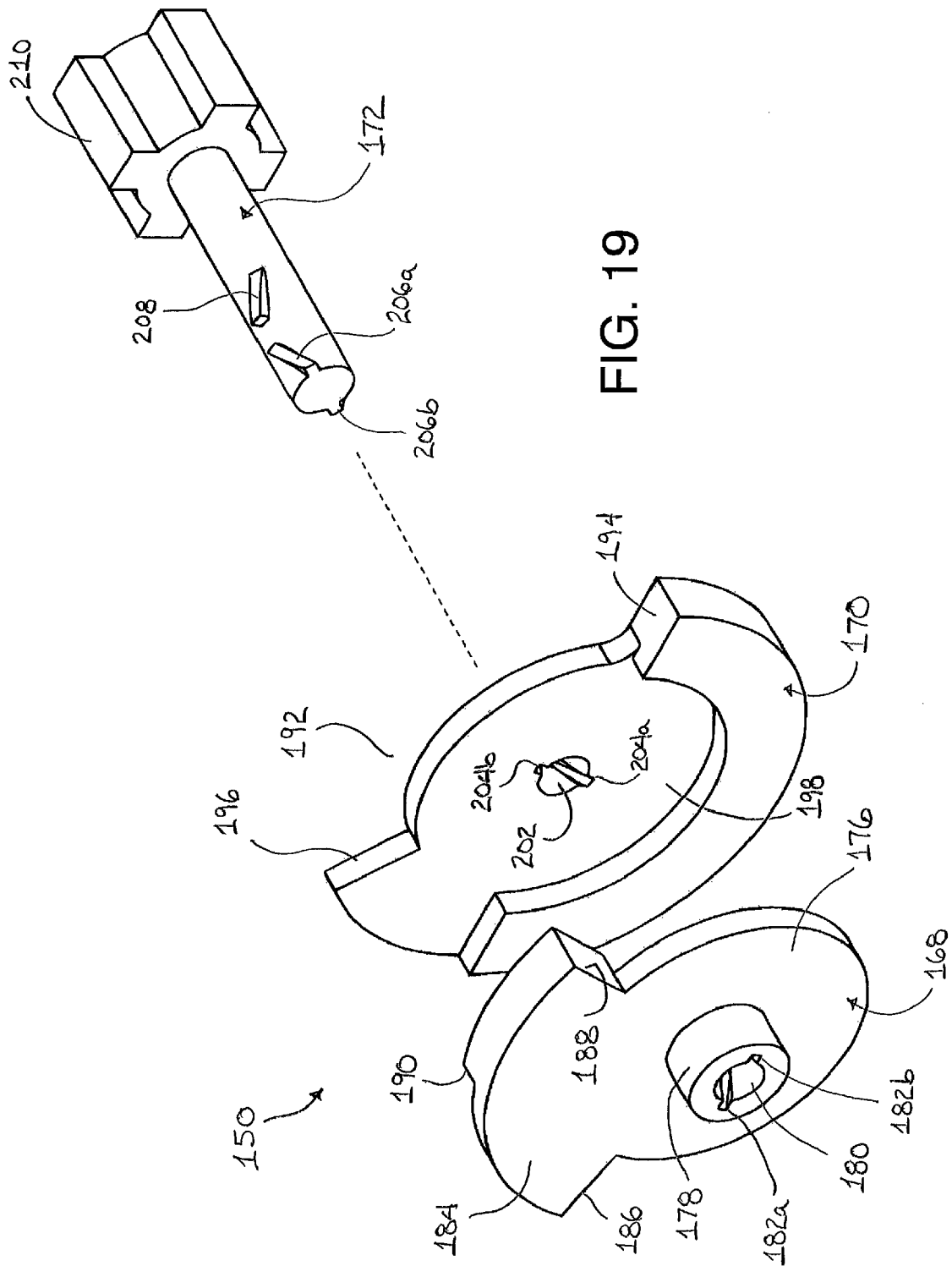
FIG. 19 is an exploded perspective view of an actively variable rotor valve assembly in accordance with an aspect of the present invention.

As understood from FIG. 19, rotor shaft 172 is provided with a first set of two helical keys or protrusions 206a, 206b and a second set of two helical keys or protrusions 208 (one shown in FIG. 19). A rotor alignment spline 210 is also provided on rotor shaft 172. The mechanical linkage of rotary valve assembly 150 to rotor shaft 172 is provided by engagement of the first set of helical keys 206 with the helical grooves of valve disk 168 and engagement of the second set of helical keys 208 with the helical grooves 204 of valve disk 170. Axial movement of rotor shaft 172 relative to valve disks 168, 170 thus imparts relative rotational movement of valve disks 168, 170 on rotor shaft.

Figure 21:
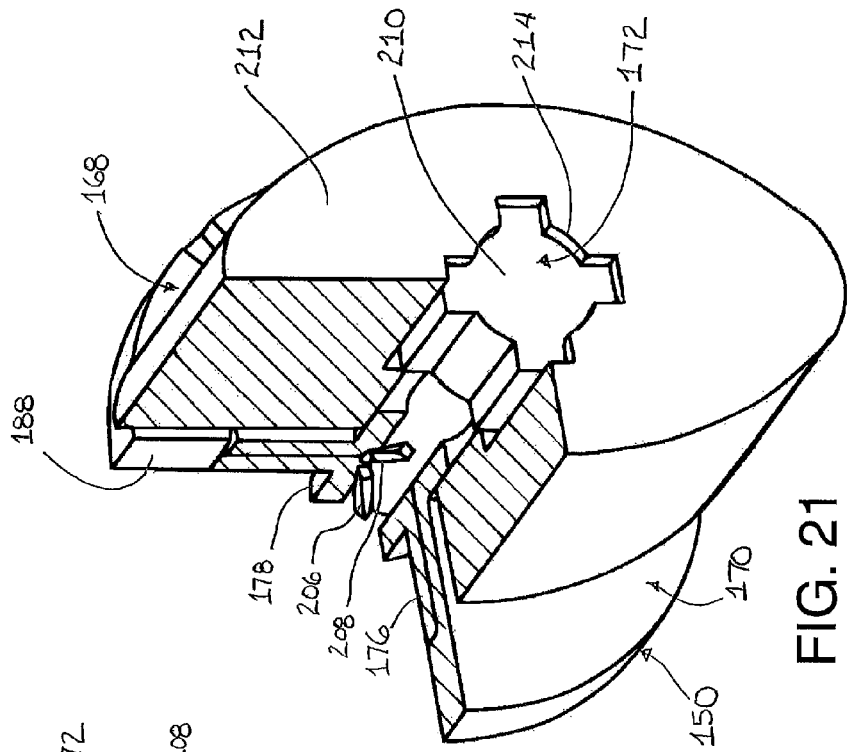
FIGS. 20 and 21 are partial cutaway views of the rotary valve assembly of FIG. 19 shown mounted to a rotor.
Figure 20:
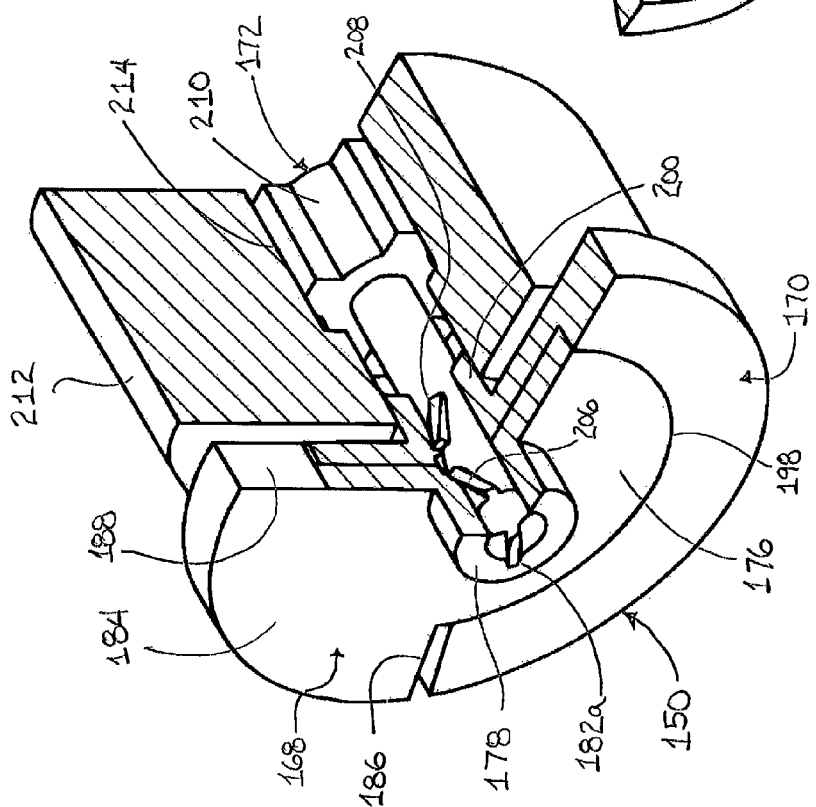
Figure 22:
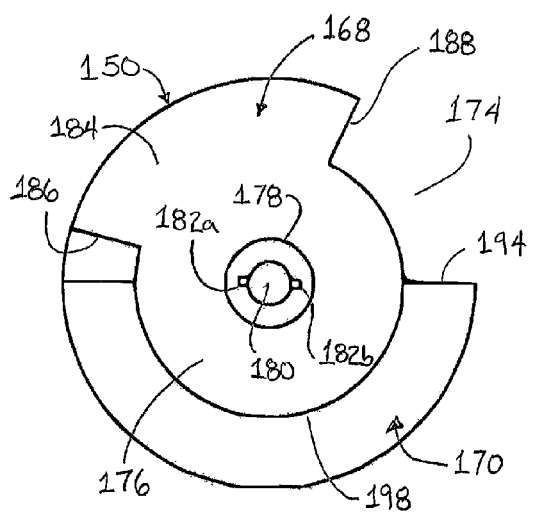
FIG. 22 is a top plan view of the rotary valve disks of FIG. 19 shown removed from the rotor shaft.
Figure 23:
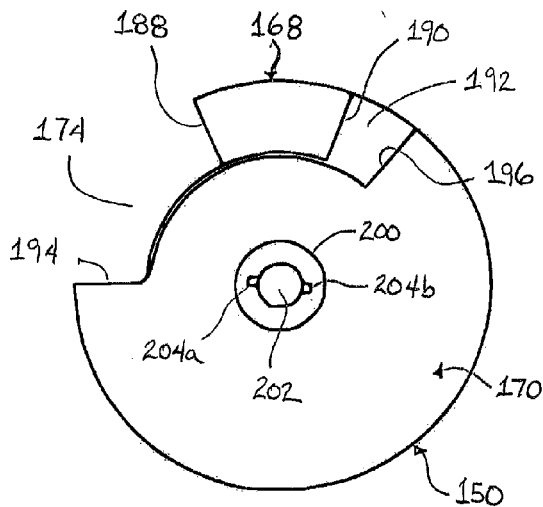
FIG. 23 is a bottom plan view of the rotary valve disks of FIG. 22.

FIGS. 20 and 21 illustrate rotor shaft 172 assembled to a rotor 212, with rotor 212 including a grooved cavity 214 for receiving spline 210. Spline 210 thus secures rotor shaft 172 for rotation with rotor 212, with cavity 214 being longer than spline 210 such that spline 210 and rotor shaft 172 are able to move in a translational manner relative to rotor 212. Rotor shaft 172 extends through intake and exhaust valve plates and may be translated axially a small amount during engine operation to import variable valving. While the rotor 212 turns with the shaft 172, it is prevented from translating by bearings. The valve disks 168 and 170 are similarly constrained from axial motion by bearings such that they remain within valve plate cavities when rotor shaft 172 is axially moved.

Figure 24:
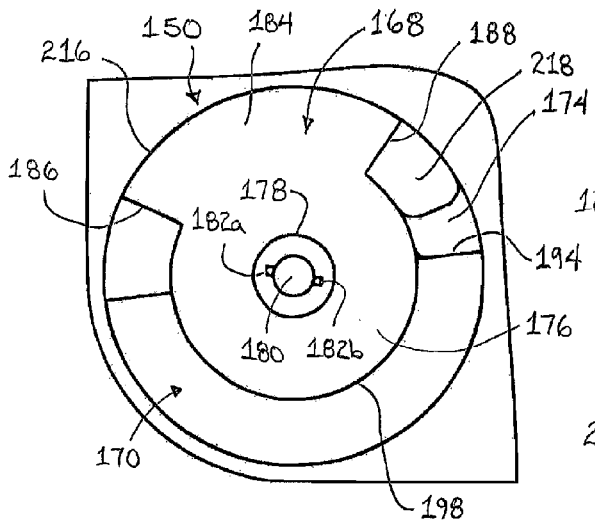
FIGS. 24 and 25 disclose the rotary valve of FIG. 19 mounted relative to a valve plate having a valve port with the rotary valve shown with alternatively sized valve openings.
Figure 25:
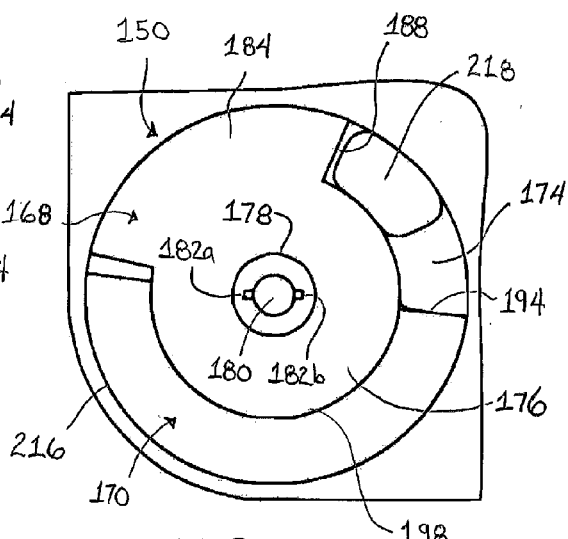

Axial translation of rotor shaft 172 during operation of engine 40, potentially based on a function of RPM or other operating characteristics, will cause valve disk 168 and/or valve disk 170 to rotate through a small incremental angle with respect to the turning rotor shaft 172 based on the geometrical mechanical linkage cooperation of the helical keys 206, 208 on the rotor shaft 172 and the helical grooves 182, 204 on valve disks 168 and 170. Valve disks 168 and 170 thus may cooperatively provide a valve opening 174 that varies in cross-sectional area and/or timing, which adjustments may be based on engine RPM and/or engine load and may be controlled by an engine computer and/or vacuum pressures or the like during operation. FIGS. 24 and 25 illustrate the adjustment of valve disks 168, 170 within a valve capacity 216 relative to a valve port 218 to create a smaller valve opening 174 (FIG. 24) or a larger valve opening 174 (FIG. 25).

Variable rotary valving can be accomplished either by rotating valve disks 168, 170 in equal but opposite angular directions relative to each other, also referred to as indexing; by rotating valve disks 168, 170 in equal angles and in the same sense relative to the rotor shaft 172, also referred to as phasing; or using any combination of indexing and phasing. Index and phase characteristics would be determined by the helical grooves and keys. Thus, effective intake or exhaust valve opening, closing, and duration times could be varied as a position of the rotor shaft by varying the angle of the helical grooves and keys. As beneficial intake timing is a function of engine speed and rotor position, variable valving could be utilized to adjust the intake duration and timing to optimize the airflow into the combustion chamber of the combustion engine embodiment of the planetary rotary engine at all engine speeds.

Axial movement or translation of rotor shaft 172 with respect to valve disks 168, 170 may be produced by a mechanical push-pull force imposed on rotor shaft 172, such as by push rods. Another method for introducing relative axial motion between the valve plates 168, 170 and the rotor shaft 172 may be via electromagnetic means under microprocessor control. In the latter embodiment, axial motion of the rotor shaft 172 is achieved in much the same way a linear electromagnetic actuator or liner differential variable transducer (LVDT) works. For example, a portion of the translatable shaft may be wound as an electromagnet and a second electromagnet fixed near the shaft ends can be controlled to attract or repel the shaft electromagnet by varying the second electromagnet's exciting current under microprocessor control. Axial springs can be used to balance the electromagnetic attraction or repulsion forces along the rotor shaft axis holding it from further axial movement at a given measured RPM. Many other methods for moving a shaft axially under computer control exist and the above approaches are merely indicative.

The alterations to valve opening 174 based on translational movement of rotor shaft 172 depend on the configuration of the mechanical linkage between valve disks 168, 170 and rotor shaft 172. If the two pairs of helical keys and grooves have the same pitch but opposite senses, then the two valve disks will rotate incrementally in opposite directions with respect to the rotor shaft and the valve opening size will either increase or decrease. If one of the two valve disks on the rotor shaft is located on a steep helix and the other on a shallow helix then both relative timing and valve opening size can be varied as a function of engine RPM as the rotor shaft translates axially. If only timing variations with RPM are desired, then making the helices with the same pitch and same sense would cause the valve disks 168 and 170 to rotate identical amounts with respect to the shaft such that the timing relative to the engine cycle of when the valve opening and the intake or exhaust port lined up would change.

Alternatively, a rotary valve having active variable valve timing may be achieved using a single valve disk having a fixed valve opening size, such as rotary intake valves 50 of FIG. 5. In such an embodiment only the timing of when the intake or exhaust port is opened can be varied, not the effective port size and/or duration. Still further, one of the rotary valve disks in an alternative two disk rotary valve may be fixed to the rotor shaft with the other being adjustable in the manner described herein.

Each valve opening is aligned with the fixed exhaust and/or intake port during a portion of the engine cycle, and the effective size and/or opening duration of the exhaust and/or intake port is dictated by the size of the valve opening, which may be varied with engine RPM. The keys and grooves may be shaped to optimize the intake port opening position/timing, size, and/or duration relative to engine RPM. For example, the keys and grooves may be designed so that at slower RPM, intake is retarded and duration is reduced while advanced intake start and longer duration occurs as RPM increases. The taper of the helical keyways determines whether only the timing of the intake port being open or only the duration and/or size of the effective intake port is changed or whether a combination of these quantities is changed.

At idling RPM, the valve disks may be positioned in a first relative position in which the valve opening size forms a minimal area. As RPM increases, the first and/or second valve disk may be caused to rotate with respect to the rotor shaft in directions to increase the size of valve opening. The size of valve opening 174 may be increased by rotation of first disk 168 by itself rotation of second disk 170 by itself or simultaneous rotation of first and second disks 168, 170 in opposite directions relative to each other.

Depending on the relative sizes of the valve opening and the corresponding intake or exhaust port the corresponding size of the effective intake/exhaust port and/or the duration of when it is open will change with RPM. There are also changes in the effective intake or exhaust port opening and closing times if the valve opening size changes. If the angular changes in the two valve disks are equal in magnitude but opposite in direction so as to make valve opening smaller in size the start of the effective intake or exhaust port being open is delayed and the time it closes is advanced. However, the center of the time interval the effective intake/exhaust port is open remains fixed, and thus the effective intake or exhaust valve timing is not changed, just the size of the effective port and/or the duration of the effective port is open. Similarly, if the angular changes of the two valve disks with respect to the rotor shaft are unequal in magnitude but still opposite in sense both the valve opening size and the effective intake or exhaust valve timing are changed. Finally, if the angular changes of the two valve disks with respect to the rotor shaft are equal in magnitude and in the same angular direction the valve opening size is not changed, but the effective intake/exhaust port timing is changed. Whether it is the effective valve opening size that changes mostly or the effective opening duration that changes mostly depends on the relative sizes of the variably sized valve opening and the fixed size of the intake and/or exhaust ports based on geometric considerations of how these two physical ports overlap to produce an effective intake or exhaust port.

With each rotary valve assembly of an engine individually indexed to its own mating rotor shaft, the effective port area, duration and opening closure timing may all be altered while the engine is operating. Since all parameters of the valve event can be changed, the engine can be made more efficient during part power operation, increase its power at high RPM, and reduce emissions in internal combustion embodiments through the majority of its operating range. As an additional option under variable valving and with multiple rotary valve assemblies actively involved, each shaft can be translated a different axial distance, creating independent valve plate rotations. Adjusting each rotary valve assembly independently allows different sections of each intake and/or exhaust port to become either closed or open, depending on the requirements of engine 40. This would allow for finely graded control of the amount and timing of charge supplied into the combustion chamber, as well as the exhausting of combustion gasses there from.

Throttling losses present in a four-stroke Otto cycle combustion engine embodiment of the planetary rotary engine with conventional throttling applied as a means of power control may be compensated with variable valving. To compensate, a delayed start of compression could be employed using the active variable valving system to reduce the mass in the chamber, allowing throttling losses to be minimized and part power efficiencies to be further improved in the multi-lobe planetary rotary engine. The delayed start of compression could be accomplished as a late intake closure process.

The planetary rotary engine of the present invention also has the potential to produce more power at wide-open throttle by indexing the valve plates for highest volumetric efficiency. With high volumetric efficiency, the mass of intake charge in the center chamber is increased for each cycle resulting in greater power potential. With proper intake valve plate phasing, the intermittent intake pulses can provide increased charge density at the time of valve closure, increasing potential power output. At higher RPMs, a translation of the rotor shafts within the engine would result in a relative rotation of the valve plates about the rotor shaft axis. This rotation would phase each of the valves relative to the centerline of the compression rotor 100, resulting in a change in valve opening and closing angles. Alterations to the helical spline shape and angle would allow optimal intake opening and closing timing throughout the range of operating speeds.

Figure 26:
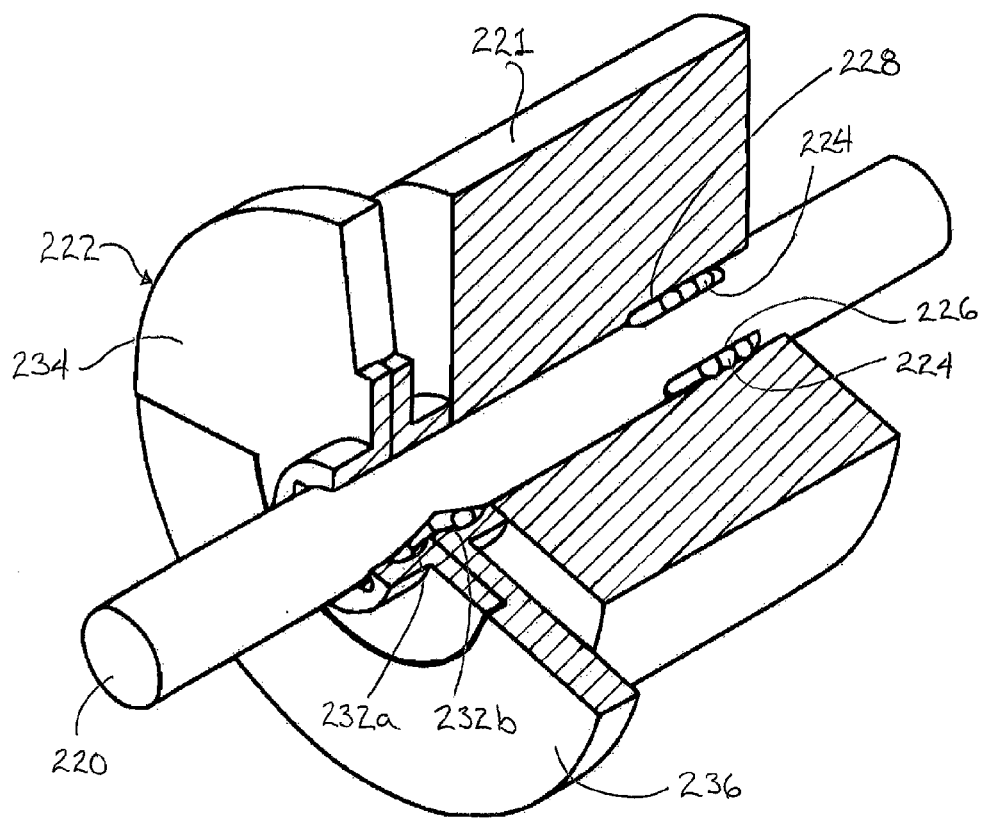
FIG. 26 is a partial cutaway perspective view of an alternative actively variable rotor valve in accordance with an aspect of the present invention disclosing an alternative drive linkage system.
Figure 27:
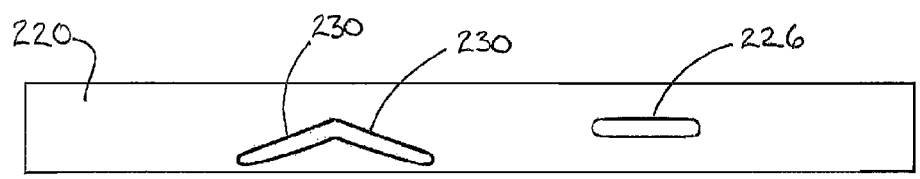
FIG. 27 is a side plan view of the rotor shaft of FIG. 26.

FIGS. 26 and 27 illustrate an alternative linkage between a rotor shaft 220 and rotary valve 222 utilizing ball bearings 224 for both imparting relative rotational movement of the valve disks 234, 236 with respect to the rotor shaft 220 and for constraining relative rotational movement between the rotor 221 and rotor shaft 220, but permitting axial movement of the rotor shaft 200. Rotor shaft 220 includes grooves 226 and rotor 221 includes grooves 228 for receiving ball bearings 224 for transmitting motion between rotor 221 and rotor shaft 220. Likewise, rotor shaft 220 includes grooves 230 for receiving ball bearings 224 between rotor shaft 220 and first and second valve disks 234, 236, where the ball bearings 224 operate within helical grooves 232a, 232b on first and second valve disks 234, 236 to impart relative rotational movement of the first valve disk 234 and/or the second valve disk 236 with respect to the rotor shaft 220 based on axial translational movement of the rotor shaft 220. Although not shown, in the embodiment of FIGS. 26 and 27 the helical grooves 232a, 232b of the first and second valve disks 234, 236 would include a curved profile, as would the various other grooves on rotor shaft 220 and rotor 221. Alternatively, relative to both arrangements of FIGS. 19-21 and 26-27, a single helix or groove, respectively, on the rotor shaft and corresponding single groove on the first and second valve disk may be employed.

Figure 28:
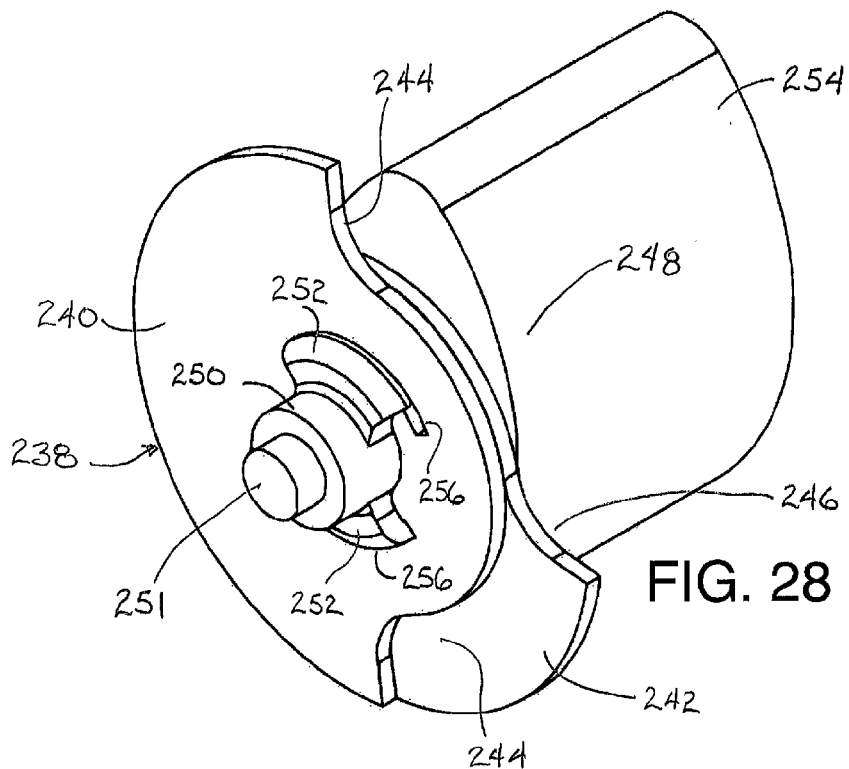
FIGS. 28 and 29 are perspective views of an alternative actively variable rotary valve in accordance with an aspect of the present invention shown mounted to a rotor and disclosing alternatively sized and oriented valve openings.
Figure 29:
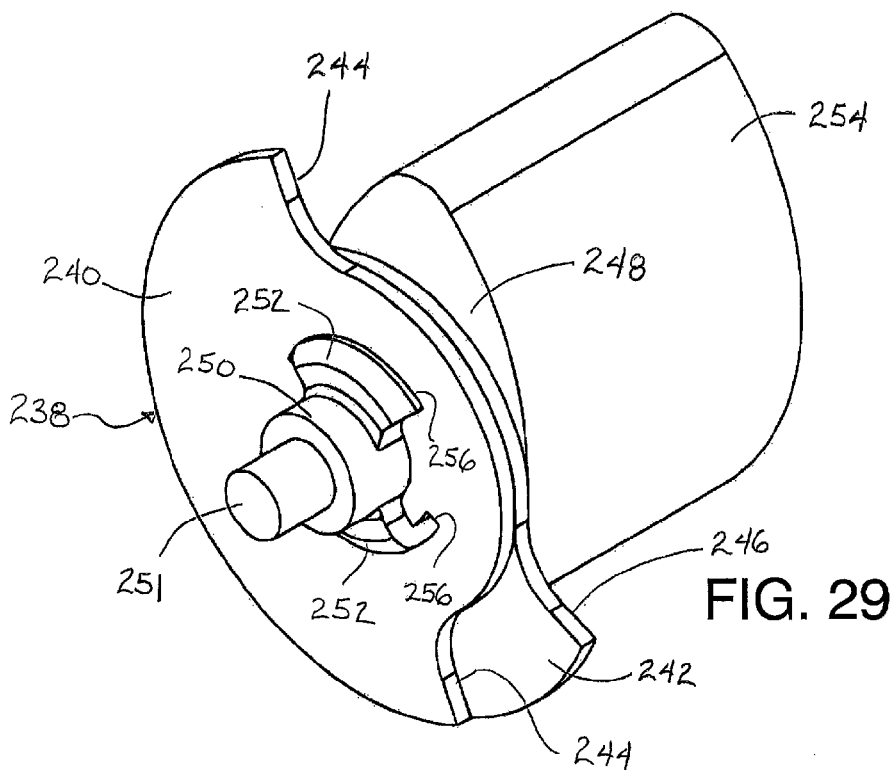

FIGS. 28 and 29 disclose another alternative rotary valve configuration for active variable valving. Rotary valve assembly 238 includes two substantially plate like valve disks 240, 242, each of which includes an arcuate or arced cutout 244, 246, respectively, with the overlapping cutouts 244, 246 forming the valve opening 248. A collar or coupling 250 is mounted over rotor shaft 251 and includes arms 252 that connect to rotor 254 through arced slots 256 in valve disk 240, as well as in corresponding arced slots (not shown) in valve disk 242. Valve disks 240 and 242 are configured for relative rotational movement by heleical keys or ball bearings, or an alternative linkage. The connection of coupling 250 to rotor 254, however, allows shaft 251 to move independently of rotor 254 without an internal spline, with shaft 251 sliding internally of coupling 250.

Referring now to FIGS. 29A and 29B, yet another variable valving rotary valve 239 is illustrated, with rotary valve 239 configured for use in an embodiment where the valve ports are exposed every approximately 180 degrees, such as in a two-stroke engine application. Rotary valve 239 includes a first disk 241 nested within a second disk 243 in generally like manner to valve disks 168, 170 of rotary valve 150. Rotary valve 239, however, includes a first valve opening 247 and a second valve opening 249. Each valve disk 241, 243 may include a collar 251 having one or more helixes (one shown in FIGS. 29A and 29B) for relative rotational movement on a rotor shaft via axial translational movement of the rotor shaft in like manner to rotary valve 150. Such translational movement may cause valve disks 241, 243 to rotate in opposite directions relative to each other to thereby either simultaneously increase or decrease the relative size of valve openings 247, 249. The opening timing may likewise be altered. It should be understood that the herein discussed alternatives regarding the mechanical linkage and rotation of one or both valve disks apply to rotary valve 239.

Still further, an alternative rotor shaft configuration may be employed to eliminate the need to translate the entire rotor shaft by mounting a cylindrical sleeve (not shown) over the section of the rotor shaft on which the valve disks are mounted. The sleeve turns with the rotor shaft, but when variable valving is active, the sleeve also translates axially a small amount with respect to the main rotor shaft. In this case, the helical keys would be on the sleeve not the rotor shaft and the action of the helical keys on the translating sleeve and the helical grooves on the inside surface of the valve plate center cylinders would cause the same relative angular changes of the valve plates with respect to the rotating shaft and sleeve as if the shaft moved as a whole.

Alternative arrangements may be employed with respect to the above discussion wherein two rotary intake valves are located on the intake valve plate and two rotary exhaust are located on the exhaust valve plate. For example, all valves may be located on one side. Not all of the valves need be actively adjustable variable valves. More or fewer than two valves per side may be employed. Still further, alternative end walls or end wall assemblies may be utilized. For example, an engine having a solid end wall may be configured, such as by forming unitarily with the housing block.

III.

Figure 30:
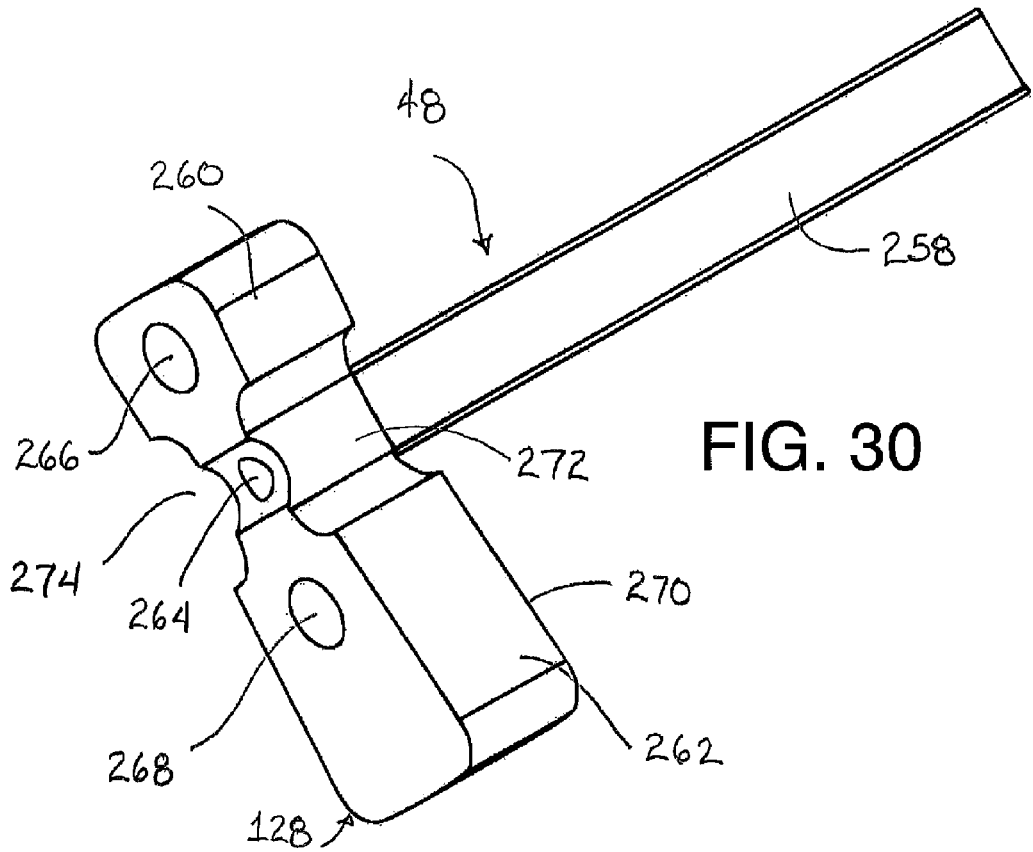
FIG. 30 is a perspective view of a compression insert in accordance with an aspect of the present invention.
Figure 31:
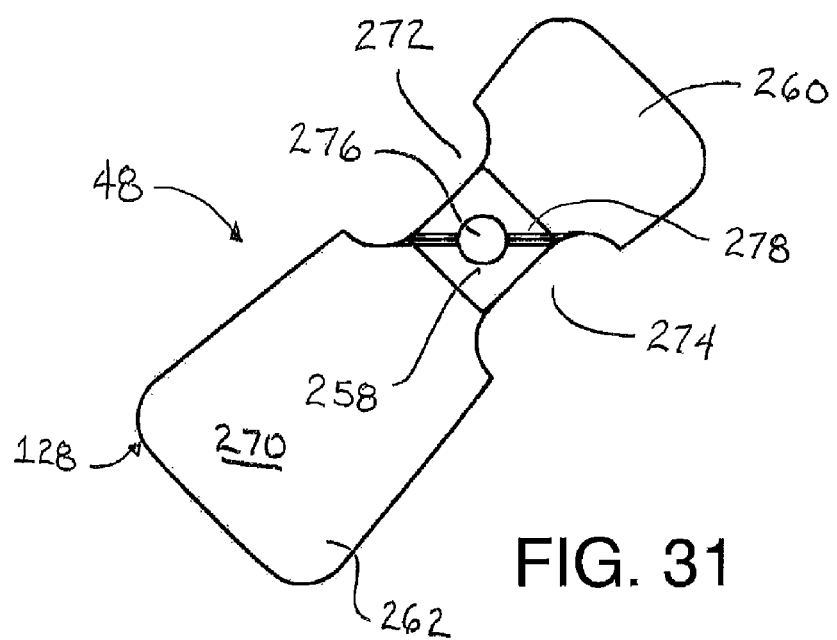
FIG. 31 is a bottom plan view of an end of the compression insert of FIG. 30.

Compression insert 48 will now be described in further detail with reference to FIGS. 30 and 31. Compression insert 48 is generally T-shaped and includes an elongate portion or shaft 258 connected to mounting head 128. Mounting head 128 includes a pair of arms 260 and 262 extending generally perpendicularly relative to shaft 258, with a central through hole 264 for affixing head 128 to shaft 258. Each arm 260, 262 includes a mounting hole 266, 268, respectively, which mounting holes 266, 268 align with the mounting holes 162, 164 of valve plate for securing head 128 within insert cavity 160. As noted, the underside 270 of mounting head 128 is thus flush with interior surface of valve plate 140. Mounting head 128 further includes a pair of cutout regions 272, 274 between arms 260, 262, with cutout regions 272, 274 conforming to the shape of intake ports 92 (FIG. 9) when assembled. Shaft 258 includes a mounting hole 276 (FIG. 31) for receiving a threaded fastener for securing the opposite end of compression insert 48 to an exhaust valve plate 100. Still further, shaft 258 includes a groove 278 at the exhaust valve plate 100 end which may be used to mate with a corresponding ridge (not shown) on an exhaust plate 100 for maintaining alignment of compression insert 48.

As shown in FIG. 12, rotors 44 rotate in proximity to compression insert 48 at the minimum volume of combustion chamber 46, such that compression insert 48 raises the effective compression ratio within engine 40 when installed by occupying the volume between rotors 44.

Moreover, because compression insert 48 is fixedly secured to both the intake valve plate 74 at one end and to the exhaust valve plate 100 at the opposite end, compression insert 48 absorbs a portion of the flexing combustion forces in a tensile manner created during a combustion event that tend to outwardly deflect intake plate 74 and exhaust valve plates 100. This enables intake plate 74 and exhaust plate 100 to be made thinner as compared to operation without compression insert 48, which is significant in that it decreases the volume of the intake ports 92 and exhaust ports 108, thereby further decreasing the total volume within the combustion chamber 46. With reference to FIGS. 17 and 18 for example, it will be appreciated that when rotary valves 150, seal valve ports 154a, 154b, (valve openings 174 not aligned with valve ports 154a, 154b) valve ports 154a, 154b have a volume based on their cross-sectional area and the thickness of the valve plate 140 at valve ports 154a, 154b. These volumes of the various ports 154 increase the overall combustion volume, including at the minimum volume of the combustion chamber 46 (FIG. 12). Accordingly, the decrease in volume at the valve ports 92, 108 and/or 154 further improves the compression ratio of engine 40.

IV.

Figure 32:
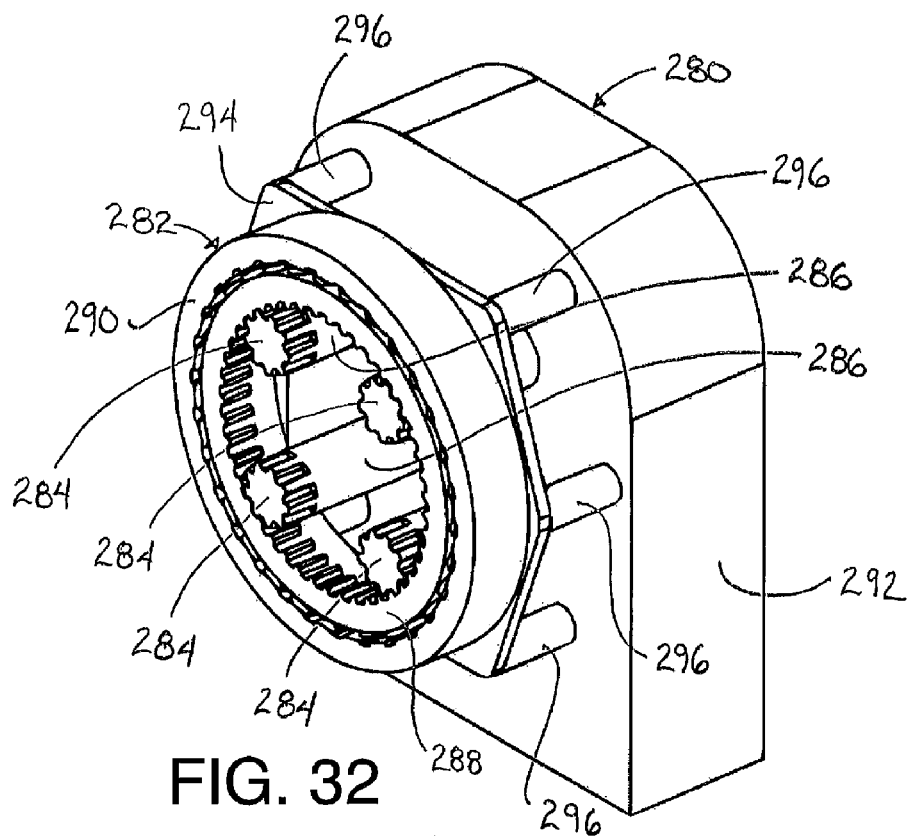
FIG. 32 is a perspective view of a planetary rotary engine affixed with an electrical generator system in accordance with an aspect of the present invention.
Figure 33:
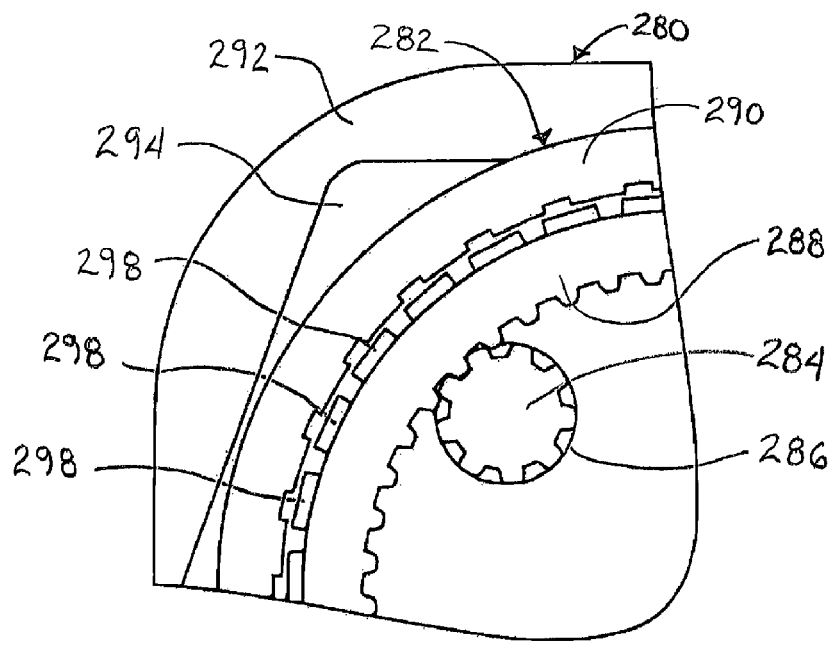
FIG. 33 is a partial front plan view of the planetary rotary engine and electrical generator system of FIG. 32.

Referring now to FIGS. 32 and 33, a planetary rotary engine 280 may include an electrical generator system 282 to generate electrical power for operation in a vehicle as a parallel-type or series-type hybrid motor vehicle power plant. Planetary rotary engine 280 may include one or more of a compression insert, active variable valving, and/or a precompression charge system such as described above in connection with planetary rotary engine 40, or may not include any of such features.

Hybrid motor vehicles may employ one or more electric motors arranged in a parallel or series configuration to apply motive power to the vehicle drive wheels. A rechargeable energy storage system (RESS), typically a rechargeable battery pack, is incorporated in the vehicle to provide power to the electric motors to drive the vehicle wheels, which may be recharged by a generator driven by engine 280.

Planetary rotary engine 280 includes geared ends 284 on each of the four rotor shafts 286 and a synchronization ring gear 288 positioned about the outer diameter of each rotor shaft geared end 284 such that all torque from the planetary rotary engine 280 is transferred to ring gear 288. Ring gear 288 may be utilized in the power generation for a hybrid configuration. An outer housing of coiled wire 290 stationarily mounted to housing block 292 via plate 294 supported by posts 296 is disposed about ring gear 288. A plurality of magnets 298 located on the outside of ring gear 288 (FIG. 32) rotate internally to the outer housing of coiled wire 290 based on rotation of the rotors of engine 280 to induce a current into the system that can be used in a hybrid application.

For a series-type hybrid motor vehicle configuration, this power generation can be used to power a battery, which powers a separate electric motor. Both the electric motor and the planetary rotary engine 280 may be coupled to the same output shaft through gearing. For a parallel-type hybrid motor vehicle configuration, ring gear 288 would provide power to either batteries or an electric motor directly depending on need. The power can also be taken directly out of the system as a stand-alone generator unit. Output frequency is a function of the speed of rotation and the number of poles, given as:

$$\frac{N_s \times p}{120} = f,$$

where $N_s$ is the rotation speed in revolutions per minute, p is the number of poles, and f is the output frequency in Hz. Designing a speed for the planetary rotary engine to operate in a generator mode would allow a gear combination to produce the desired rotation speed. The number of poles could also be varied to optimize the system.

Ring gear 288 may additionally be utilized as a starter motor. Using the batteries to power ring gear 288 could allow ring gear 288 to force the rotors of planetary rotary engine 280 to begin rotating, acting as a starter in a traditional engine. Alternatively, in a non-fired model, a ring gear such as above could act as an electric powered air compressor with the ring gear driving rotors of a planetary rotary engine to compress gas.

Alternatively, a ring gear could be wrapped in a series of windings and the windings rotated through a magnetic field to induce a current for applications in hybrid power systems. A ring rear may additionally be geared externally to a shaft to allow torque to be transferred out of the system, or a shaft may be located on one of the engine gears, and the ring gear serves to couple the forces from each rotor together.

V.

Figure 34:
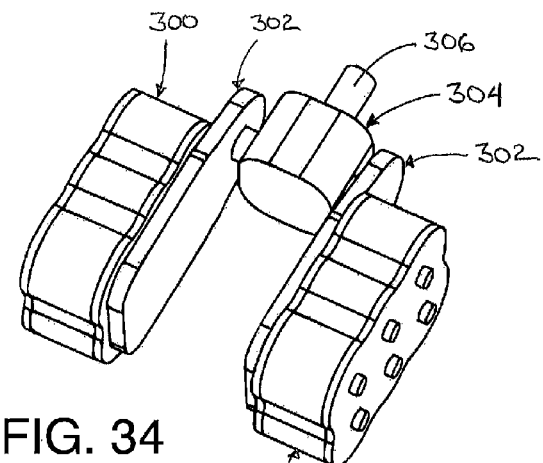
FIG. 34 is a top perspective illustrative view of two, six rotor, planetary rotary engines coupled to a common output shaft via a gear box.
Figure 35:
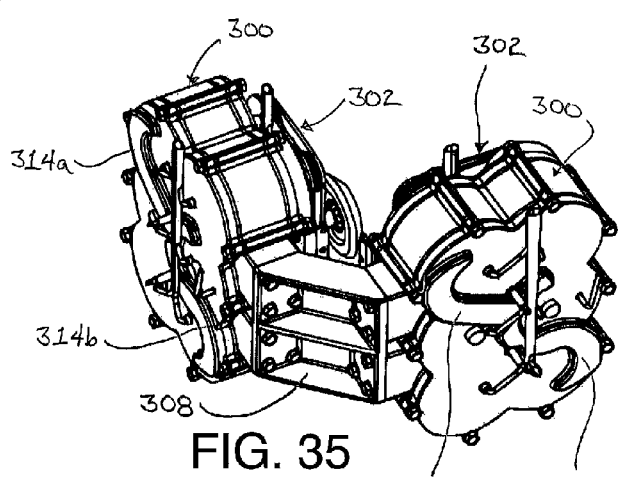
FIGS. 35 and 36 are rear and front perspective views of two, six-rotor, planetary rotary engines coupled together.
Figure 36:
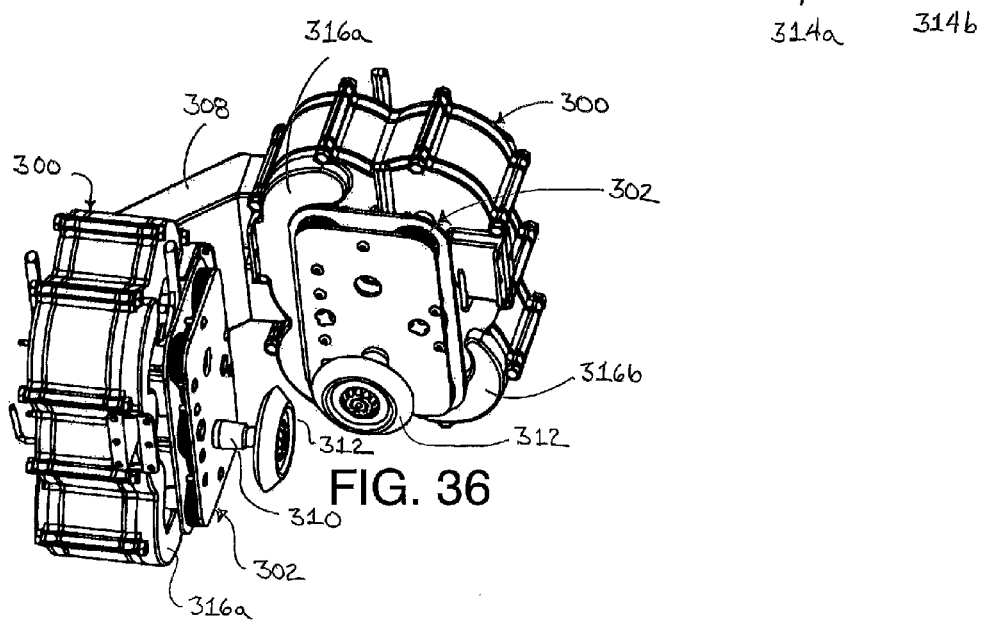

In still further embodiments one or more planetary rotary engines, such as a planetary rotary engine 40, may be arranged together in an array whereby the drive outputs of the planetary rotary engines are coupled together to a common drive or output shaft. The planetary rotary engine drive shafts may be supported to extend in one of a V-engine configuration, a flat engine configuration or a rotary engine configuration. For example, FIG. 34 illustrates a pair of six rotor planetary rotary engines 300 coupled together, with drive systems 302 of each engine 300 coupled together to a common gear box 304 having an output shaft 306. With reference to FIGS. 35 and 36, a pair of six rotor planetary rotary engines 300 are coupled together via a brace 308, with drive systems 302 of each engine having a geared output shaft 310. Geared output shafts 310 are arranged for coupling to a common gear box (not shown). Brace or bracket or engine mount 308 that orients the drive shafts 310 at 90 degrees to one another. The gear box (not shown) having a common output gear meshes with the output gears 312 of the planetary rotary engines 300 depicted for converting the rotary motion of drive shafts 310 into rotary motion of a common drive or output shaft. A transmission may be coupled to the common output or drive shaft.

As understood from FIGS. 35 and 36, each six rotor planetary engine 300 includes two internal combustion chambers (not shown) and incorporates the above discussed precompression charge system. Each engine 300 includes manifolds or plenums 314a, 314b for supplying the precompressed charge from the transfer ports (not shown) to a combustion chamber, as well as manifolds or plenums 316a, 316b for providing the charge to the precompression intake ports (not shown). Thus, each engine 300 includes an upper and lower precompression charge system provided by the corresponding adjacent two upper and lower rotors within the housing of engines.

Alternative arrangements may be constructed. For example, a flat or horizontally opposed configuration can be formed by arranging one or more planetary rotary engines within a single plane such that the drive or output shafts of the planetary rotary engines extend away from the gear box at 180 degrees. Similarly, banks of a plurality, such as four or eight planetary rotary engines, may be arrayed, supported and coupled together to extend the drive or output shafts of the planetary rotary engines radially in the same plane to an output gear box in a fashion similar to piston engines of propeller aircraft. Still further banks of one or more planetary rotary engines may be arrayed, supported and coupled together to extend the drive or output shafts of the planetary rotary engines to the gear box in a V-engine configuration.

The configuration of multiple planetary rotary engines together provides the ability to change the number of torque pulses per angular rotation of the output shaft in real-time. By changing the phasing between the planetary rotary engine banks, either complimentary torque pulses or sequential torque pulsing can occur. The planetary rotary engine with its compact size and multiple configurations can accommodate this phasing in a beneficial fashion even while operating. Hence, one planetary rotary engine bank can operate as either a multiple cylinder, multiple torque pulse per revolution engine or a multiple cylinder single torque pulse per revolution, increasing its applications.

VI.

Although discussed above in regard to a fueled combustion engine, such as for propelling a vehicle and/or generating power, the above features may alternatively be employed in a pressurized fluid driven generator, pump, or compressor or the like. Alternately, planetary rotary apparatuses may be driven by an external source of power driving the common shaft with the individual planetary apparatuses functioning as compressors. Moreover, the above discussed features may be employed in either a spark ignition engine or a compression ignition (diesel) engine. The cyclic behavior corresponds well with the cyclic behavior of both a four-stroke and two-stroke engines. For example, the compression of the air or air-fuel mixture as described above is beneficial in two-stroke diesel or spark ignited engine embodiments because as the pressurized air or air-fuel mixture is introduced into the central chamber, it aids in purging the exhaust gas from the central chamber. Similarly, the compression of the air or air-fuel mixture as described above is beneficial in four-stroke engine embodiments because the pressurized air or air-fuel mixture introduced into the central chamber effectively increases the central chamber compression ratio.

The planetary rotary apparatus or engine may be utilized with any combination of the above discussed features regarding precompression of a charge, active variable valve timing, and a compression insert, as well as applied to a conventional vehicles, hybrid vehicles, and/or may be used in combination with an array of connected planetary rotary apparatuses. Alternative drive systems other than the drive system 42 connected to engine 40 may be employed.

Figure 37:
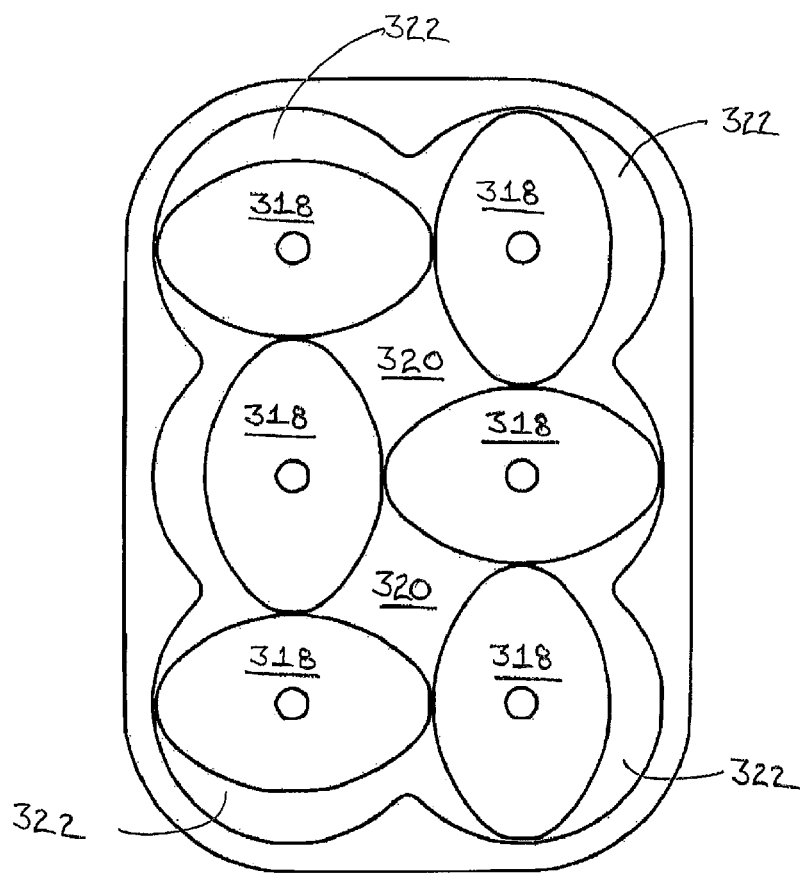
FIG. 37 is a front plan schematic view of an alternative arrangement of rotors that may be employed with aspects of the present invention with the rotors contained within a housing chamber having a plurality of semi-circular wall portions.
Figure 38:
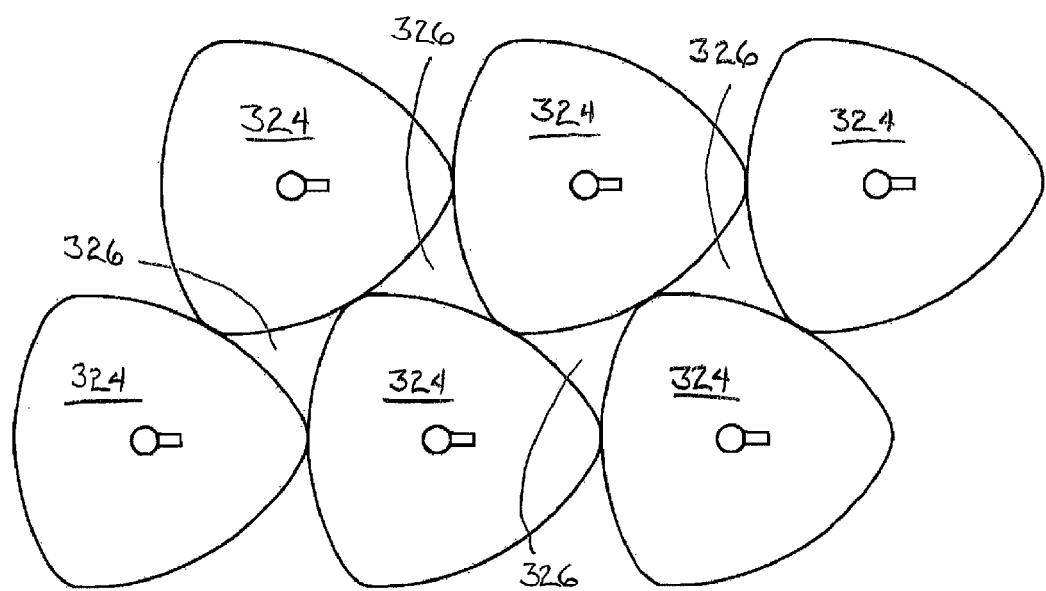
FIG. 38 is a top plan view of alternatively configured rotors that may be employed with aspects of the present invention.

Still further, with reference to FIGS. 37 and 38, the above discussed features may be employed with planetary rotary engines or apparatuses having additional rotors and/or rotors having alternative cross sectional profiles. For example, additional rotor-defined inner combustion chambers can be created by adding a sufficient number of additional rotors arrayed in a pattern that enables an inner chamber to be formed, such as by four adjacent elliptical rotors. An array of six elliptical or oval rotors 318 forming two central chambers 320 and a plurality of outer chambers 322 is illustrated in FIG. 37. An array of six tri-lobed rotors 324, instead of elliptical or oval shaped rotors, forming four central chambers 326 is illustrated in FIG. 38, where a single central chamber 326 is defined by three triangular rotors 324.

The planetary rotary apparatus of the present invention as disclosed in a planetary rotary engine embodiment improves the compression ratio, provides for adjustment during operation to actively tune engine performance, and improves the power density. The charge compression system for compressing a charge of air and/or an air and fuel mixture that is precompressed by rotation of the rotors and supplied into a combustion chamber through a rotary valve improves the power density. The rotary valve may be an actively variable valve for selectively varying the intake valve openings to adjust the timing and/or duration of the intake event, and may also be used for exhausting the engine. A compression insert mounted between the end wall assemblies absorbs combustion forces and provides rigidity to the engine, enabling the valve port volume to be minimized, as well as occupies all or nearly all of the volume between the rotors at the minimum volume of the combustion chamber, thereby effectively raising the compression ratio of the engine. A compressed air charge may alternatively or additionally be supplied into an exhaust system or manifold for reducing emissions. A planetary rotary engine may integrally include an electrical generator for use in hybrid power plant applications and/or multiple planetary rotary engines may be coupled together.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A planetary rotary apparatus comprising:
    a pair of end walls and a housing having an interior sidewall, said end walls and said interior sidewall defining a housing chamber, one of said end walls including an intake port and a rotary intake valve operatively mounted to said end wall outside of said housing chamber, said rotary intake valve having a valve opening with said valve opening being selectively rotated into alignment with said intake port;
    a plurality of rotors, said rotors being rotatable in concert within said housing chamber with the axes of rotation of said rotors extending between said end walls;
    an inner chamber defined between at least a portion of said rotors;
    adjacent and overlapping first and second rotor chambers, said interior wall including a first chamber wall portion and an adjacent second chamber wall portion, said first and second chamber wall portions being approximately semicircular with said first rotor chamber being partially defined by said first chamber wall portion and said second rotor chamber being partially defined by said second chamber wall portion, one of said rotors comprising a first rotor rotating within said first rotor chamber and another of said rotors comprising a second rotor rotating within said second rotor chamber;
    said first rotor chamber including a compression intake port, said compression intake port selectively enabling a charge to be provided into an outer volume of said housing chamber where said outer volume expands between said first and second rotor chambers during rotation of said first and second rotors with said charge being drawn through said compression intake port during expansion of said outer volume, said charge comprising air or a mixture of air and atomized fuel;
    said second rotor chamber including a transfer port, said charge becoming a compressed charge when said outer volume is decreased by continued rotation of said first and second rotors with said compressed charge being discharged through said transfer port out of said housing chamber; and
    a charge manifold, said charge manifold extending between said transfer port and said rotary valve with said compressed charge being delivered through said charge manifold and said rotary valve into said inner chamber when said valve opening aligns with said intake port.

2. The planetary rotary apparatus of claim 1, further including a plurality of rotor shafts with said rotors rotating on said rotor shafts, and wherein said rotary valve is mounted to one of said rotor shafts.

3. The planetary rotary apparatus of claim 2, wherein said rotary valve is rotatably connected to said one of said rotor shafts for selective relative rotational movement with respect to said rotor shaft such that said valve opening is adjustable relative to said rotor shaft by relative movement of said rotary valve on said rotor shaft.

4. The planetary rotary apparatus of claim 1, wherein said compression intake port defines an opening on one of said end walls, and wherein said intake port is selectively opened and closed by said first rotor.

5. The planetary rotary apparatus of claim 1, wherein said transfer port defines an opening on said second chamber wall portion, and wherein said transfer port is selectively opened and closed by said second rotor.

6. The planetary rotary apparatus of claim 1, wherein each said rotor has an elliptical cross sectional profile and a pair of opposed lobes.

7. The planetary rotary apparatus of claim 6, wherein said plurality of rotors comprises four rotors, and wherein said inner chamber is defined between said four rotors and said end walls.

8. The planetary rotary apparatus of claim 7, further comprising
    adjacent and overlapping third and fourth rotor chambers, said interior wall including a third chamber wall portion and an adjacent fourth chamber wall portion, said third and fourth chamber wall portions being approximately semicircular with said third rotor chamber being partially defined by said third chamber wall portion and said fourth rotor chamber being partially defined by said fourth chamber wall portion, one of said rotors comprising a third rotor rotating within said third rotor chamber and the remaining of said rotors comprising a fourth rotor rotating within said fourth rotor chamber;
    said third rotor chamber including an additional compression intake port, said additional compression intake port selectively enabling an additional charge to be provided into an additional outer volume of said housing chamber where said additional outer volume expands between said third and fourth rotor chambers during rotation of said third and fourth rotors with said additional charge being drawn through said additional compression intake port during expansion of said additional outer volume, said additional charge comprising air or a mixture of air and atomized fuel;
    said fourth rotor chamber including an additional transfer port, said additional charge becoming an additional compressed charge when said additional outer volume is decreased by continued rotation of said third and fourth rotors with said additional compressed charge being discharged through said additional transfer port out of said housing chamber; and
    an additional charge manifold, with said additional compressed charge being delivered through said additional charge manifold into said inner chamber.

9. The planetary rotary apparatus of claim 1, wherein said planetary rotary apparatus operates as a four stroke engine and wherein said rotary valve includes a single valve opening whereby multiple said compressed charges are delivered into said inner chamber for each combustion event.

10. The planetary rotary apparatus of claim 1, further including a compression insert located within said inner chamber, said compression insert extending between and affixed to said end walls to occupy a portion of the volume of said inner chamber.

11. A planetary rotary apparatus comprising:
    a pair of end walls and a housing having an interior sidewall, said end walls and said interior sidewall defining a housing chamber;
    a plurality of rotors, each said rotor being mounted to a rotor shaft with said rotors being rotatable in concert within said housing chamber with the axes of rotation of said rotors extending between said end walls;

said housing chamber including an inner combustion chamber, said combustion chamber being defined between said end walls and at least a portion of said rotors, the volume of said inner combustion chamber varying between a maximum volume and a minimum volume with rotation of said rotors defining said combustion chamber; and a compression insert, said compression insert being located within said inner combustion chamber and extending between and affixed to said end walls to occupy a portion of the volume of said combustion chamber whereby the minimum volume of said combustion chamber is substantially reduced relative to the minimum volume of said combustion chamber without said compression insert.

12. The planetary rotary apparatus of claim 11, wherein said compression insert includes an elongate portion and a mounting head, and wherein one of said end walls includes an insert cavity for receiving said mounting head.

13. The planetary rotary apparatus of claim 12, wherein said first end wall includes a valve port proximate said insert cavity, and wherein the profile of said mounting head conforms to said valve port whereby flow through said valve port is unobstructed by said compression insert.

14. The planetary rotary engine of claim 11, wherein said rotors are substantially elliptical, and wherein said combustion chamber is defined by four said rotors with said compression insert being centrally located within said combustion chamber, and wherein each said rotor includes a pair of laterally opposed lobes with one of said lobes of each said rotor of said combustion chamber being simultaneously proximate said compression insert when said combustion chamber is at the minimum volume.

15. The planetary rotary engine of claim 11, wherein one of said end walls includes a valve port and a rotary valve operatively mounted to said end wall, said rotary valve having a valve opening with said valve opening being selectively rotated into alignment with said valve port;
wherein said rotary valve is mounted to one of said rotor shafts whereby said rotary valve rotates with rotation of said one of said rotor shafts;
said rotary valve being rotatably connected to said one of said rotor shafts for selective relative rotational movement with respect to said rotor shaft such that said valve opening is adjustable relative to said rotor shaft by relative movement of said rotary valve on said rotor shaft.

16. A planetary rotary apparatus comprising:
a pair of end walls and a housing having an interior sidewall, said end walls and said interior sidewall defining a housing chamber, one of said end walls including a valve port and a rotary valve operatively mounted to said end wall outside of said housing chamber, said rotary valve having a valve opening with said valve opening being selectively rotated into alignment with said valve port;
a plurality of rotors, each said rotor being mounted to a rotor shaft with said rotors being rotatable in concert within said housing chamber with the axes of rotation of said rotors extending between said end walls;
an inner chamber defined between at least a portion of said rotors;
said rotary valve being connected to one of said rotor shafts for rotation with said rotor shaft and for selective relative rotational movement of said rotary valve with respect to said one of said rotor shafts such that said valve opening is adjustable by relative movement of said rotary valve on said rotor shaft.

17. The planetary rotary apparatus of claim 16, wherein said rotary valve comprises a first valve disk and a second valve disk, said first and second valve disks being adjacently mounted to said one of said rotor shafts whereby said first and second valve disks rotate with rotation of said rotor shaft;
said first and second valve disks cooperatively defining said valve opening, with at least one of said first and second valve disks being rotatably connected to said one of said rotor shafts for selective relative rotational movement with respect to said rotor shaft such that at least one of the size of said valve opening and orientation of said valve opening relative to said rotor shaft is adjustable by relative movement of said at least one of said first and second valve disks on said rotor shaft.

18. The planetary rotary apparatus of claim 17, wherein both said first and second valve disks are rotatably connected to said rotor shaft for selective rotational movement of said first and second valve disks relative to said rotor shaft such that at least one of the size of said valve opening and orientation of said valve opening relative to said rotor shaft is varied by relative movement of said first and second valve disks on said rotor shaft.

19. The planetary rotary engine of claim 17, wherein said first and second valve disks each include a mounting opening for receiving said one of said rotor shafts, and wherein at least one of said mounting openings of said first and second valve disks include a helical groove, and wherein axial translational movement of said rotor shaft relative to said rotary valve imparts selective rotational movement of at least one of said first and second valve disks via said rotor shaft acting on said helical groove.

20. The planetary rotary engine of claim 19, wherein said one of said rotor shafts includes at least one key protruding from said rotor shaft, said key being disposed within said helical groove, and wherein axial translational movement of said rotor shaft relative to said rotary valve imparts selective rotational movement of at least one of said first and second valve disks via said key acting on said helical groove.

21. The planetary rotary engine of claim 19, wherein said one of said rotor shafts includes a helical shaft groove, and wherein said helical shaft groove aligns with said helical groove of said at least one of said first and second valve disks with a plurality of ball bearings being disposed within said helical shaft groove, and wherein axial translational movement of said rotor shaft relative to said rotary valve imparts selective rotational movement of at least one of said first and second valve disks via said ball bearings acting on said helical groove.

22. The planetary rotary engine of claim 16, wherein said first valve disk includes a circular base portion and an arcuate portion extending from the periphery of said circular base, and wherein said second valve disk is substantially circular with said second valve disk including a well and an arcuate gap along the periphery of said second valve disk, and wherein said base portion of said first valve disk is nested within said well of said second valve disk with said arcuate portion of said first valve disk positioned at said arcuate gap of said second valve disk, and wherein said valve opening is defined by the portion of said arcutate gap of said second valve disk that is not filled by said arcuate portion of said first valve disk.

23. The planetary rotary engine of claim 16, further including a plurality of said rotary valves, and wherein at least one of said rotary valves is an intake rotary valve and another of said rotary valves is an exhaust rotary valve.

24. The planetary rotary engine of claim 16, wherein said valve assembly is nested for rotation within a valve assembly cavity of said end wall assembly, said valve assembly cavity including a valve port, and wherein said valve opening aligns with said valve port during rotation of said valve assembly such that said valve port is opened when said valve opening is aligned with said valve port.

25. The planetary rotary engine of claim 16, further including a compression insert located within said inner chamber and extending between and affixed to said end walls to occupy a portion of the volume of said inner chamber.

26. A planetary rotary apparatus comprising:
- a pair of end walls and a housing having an interior sidewall, said end walls and said interior sidewall defining a housing chamber, one of said end walls including an intake port and a rotary intake valve operatively mounted to said end wall outside of said housing chamber, said rotary intake valve having a valve opening with said valve opening being selectively rotated into alignment with said intake port;
- a plurality of rotors, each said rotor being mounted to a rotor shaft with said rotors being rotatable in concert within said housing chamber with the axes of rotation of said rotors extending between said end walls;
- an inner chamber defined between at least a portion of said rotors;
- a compression insert, said compression insert being located within said inner combustion chamber and extending between and affixed to said end walls to occupy a portion of the volume of said combustion chamber whereby the minimum volume of said combustion chamber is substantially reduced relative to the minimum volume of said combustion chamber without said compression insert;
- adjacent and overlapping first and second rotor chambers, said interior wall including a first chamber wall portion and an adjacent second chamber wall portion, said first and second chamber wall portions being approximately semicircular with said first rotor chamber being partially defined by said first chamber wall portion and said second rotor chamber being partially defined by said second chamber wall portion, one of said rotors comprising a first rotor rotating within said first rotor chamber and another of said rotors comprising a second rotor rotating within said second rotor chamber;
- said first rotor chamber including a compression intake port, said compression intake port selectively enabling a charge to be provided into an outer volume of said housing chamber where said outer volume expands between said first and second rotor chambers during rotation of said first and second rotors with said charge being drawn through said compression intake port during expansion of said outer volume, said charge comprising air or a mixture of air and atomized fuel;
- said second rotor chamber including a transfer port, said charge becoming a compressed charge when said outer volume is decreased by continued rotation of said first and second rotors with said compressed charge being discharged through said transfer port out of said housing chamber; and
- a charge manifold, said charge manifold extending between said transfer port and said rotary valve with said compressed charge being delivered through said charge manifold and said rotary valve into said inner chamber when said valve opening aligns with said intake port;
- said rotary valve being connected to one of said rotor shafts for rotation with said rotor shaft and for selective relative rotational movement of said rotary valve with respect to said one of said rotor shafts such that said valve opening is adjustable by relative movement of said rotary valve on said rotor shaft.

* * * * *